(12) United States Patent
Stewart et al.

(10) Patent No.: US 11,783,357 B2
(45) Date of Patent: Oct. 10, 2023

(54) SYNDICATED SHARING OF PROMOTIONAL INFORMATION

(71) Applicant: Share Edge, LLC, Manhattan Beach, CA (US)

(72) Inventors: Benjamin C. Stewart, Manhattan Beach, CA (US); Thomas E. Larkin, III, Manhattan Beach, CA (US)

(73) Assignee: SHARE EDGE, LLC, La Canada (CA)

( * ) Notice: Subject to any disclaimer, the term of this patent is extended or adjusted under 35 U.S.C. 154(b) by 396 days.

(21) Appl. No.: 16/595,162

(22) Filed: Oct. 7, 2019

(65) Prior Publication Data

US 2020/0111115 A1 Apr. 9, 2020

Related U.S. Application Data

(63) Continuation of application No. 13/927,022, filed on Jun. 25, 2013, now Pat. No. 10,475,059.

(60) Provisional application No. 61/702,635, filed on Sep. 18, 2012, provisional application No. 61/668,384, filed on Jul. 5, 2012.

(51) Int. Cl.
G06Q 30/02 (2023.01)
G06Q 30/0214 (2023.01)
G06Q 50/00 (2012.01)
G06Q 30/0207 (2023.01)
G06Q 30/0234 (2023.01)

(52) U.S. Cl.
CPC ..... *G06Q 30/0214* (2013.01); *G06Q 30/0215* (2013.01); *G06Q 30/0234* (2013.01); *G06Q 50/01* (2013.01)

(58) Field of Classification Search
CPC .............. G06Q 30/0215; G06Q 30/0234
USPC ............................................ 705/14.34, 14.17
See application file for complete search history.

(56) References Cited

U.S. PATENT DOCUMENTS 6,167,435 A 12/2000 Druckenmiller
6,609,104 B1 8/2003 Deaton et al.
7,398,246 B2 7/2008 Doynow
(Continued)

FOREIGN PATENT DOCUMENTS

CA 2 785 383 A1 2/2013
JP 2008-192144 8/2008
(Continued)

OTHER PUBLICATIONS

Mr. Rebates, from the Wayback Machine, downloaded Nov. 12, 2021 from https://web.archive.org/web/20111201035858/http://www.mrrebates.com:80/Default.asp and dated Dec. 1, 2011 (Year: 2011).*
(Continued)

*Primary Examiner* — Scott D Gartland
(74) *Attorney, Agent, or Firm* — Knobbe, Martens, Olson & Bear LLP

(57) ABSTRACT

Systems and methods that enable product (or service) purchasers, or other such entities, to share promotional materials via social networks and/or other means of communication and may further enable the purchasers to receive rewards, such as rebates, in response to interactions with the promotional materials by others (e.g., friends of the purchaser). In various embodiments, the promotional materials shared by the purchaser relates to the product purchased, which may lend greater credibility and/or interest in the promotional material being shared.

6 Claims, 16 Drawing Sheets

(56) References Cited

U.S. PATENT DOCUMENTS

| | | | |
|---|---|---|---|
| 7,676,396 B1* | 3/2010 | White | G06Q 30/06 705/24 |
| 8,407,062 B2 | 3/2013 | Jermyn et al. | |
| 8,522,330 B2 | 8/2013 | Shuster et al. | |
| 10,475,059 B2 | 11/2019 | Stewart et al. | |
| 10,963,903 B1 | 3/2021 | Stewart et al. | |
| 11,604,639 B2 | 3/2023 | Stewart et al. | |
| 2003/0220863 A1 | 11/2003 | Holm et al. | |
| 2004/0103426 A1 | 5/2004 | Ludvig et al. | |
| 2005/0015482 A1 | 1/2005 | Blankenship | |
| 2005/0044139 A1 | 2/2005 | Christian et al. | |
| 2006/0026032 A1 | 2/2006 | Higgins et al. | |
| 2007/0067441 A1* | 3/2007 | Pomerantz | H04L 67/535 709/224 |
| 2007/0106608 A1 | 5/2007 | Khandelwal | |
| 2007/0121843 A1 | 5/2007 | Atazky et al. | |
| 2007/0255702 A1 | 11/2007 | Orme | |
| 2008/0071775 A1* | 3/2008 | Gross | G06F 16/951 707/999.005 |
| 2009/0259538 A1 | 10/2009 | Miller et al. | |
| 2009/0271289 A1* | 10/2009 | Klinger | G06Q 30/02 705/26.1 |
| 2010/0042487 A1 | 2/2010 | Barazani | |
| 2010/0057530 A1* | 3/2010 | Parivash | G06Q 30/0238 705/14.23 |
| 2011/0106597 A1 | 5/2011 | Ferdman et al. | |
| 2011/0125569 A1* | 5/2011 | Yoshimura | G06Q 10/10 705/26.1 |
| 2011/0246265 A1 | 10/2011 | Gardenswartz | |
| 2011/0320250 A1 | 12/2011 | Gemmell et al. | |
| 2012/0130788 A1* | 5/2012 | Winslade | G06Q 30/02 705/14.23 |
| 2012/0143674 A1* | 6/2012 | Ziskrout | G06Q 30/0244 705/14.43 |
| 2012/0150598 A1 | 6/2012 | Griggs | |
| 2012/0158477 A1 | 6/2012 | Tennenholtz et al. | |
| 2012/0215615 A1 | 8/2012 | Moredock | |
| 2012/0221387 A1 | 8/2012 | Liu et al. | |
| 2012/0290938 A1 | 11/2012 | Subbarao et al. | |
| 2013/0066695 A1 | 3/2013 | Just | |
| 2013/0159089 A1 | 6/2013 | Gil et al. | |
| 2013/0218666 A1 | 8/2013 | Bruich et al. | |
| 2013/0226710 A1 | 8/2013 | Plut | |
| 2013/0231974 A1 | 9/2013 | Harris et al. | |
| 2014/0012645 A1 | 1/2014 | Stewart et al. | |
| 2014/0012654 A1 | 1/2014 | Stewart et al. | |
| 2014/0039990 A1 | 2/2014 | Georgi | |
| 2014/0106704 A1 | 4/2014 | Cooke et al. | |
| 2015/0039413 A1* | 2/2015 | Winkler | G06Q 30/02 705/14.34 |
| 2015/0112774 A1 | 4/2015 | Georgoff et al. | |
| 2017/0154347 A1 | 6/2017 | Bateman | |
| 2017/0220333 A1 | 8/2017 | Higginson | |
| 2018/0129546 A1 | 5/2018 | Mullins et al. | |
| 2018/0275966 A1 | 9/2018 | Linton et al. | |
| 2019/0102078 A1 | 4/2019 | Bhatt et al. | |
| 2019/0347082 A1 | 11/2019 | Gurtin et al. | |
| 2021/0263726 A1 | 8/2021 | Stewart | |
| 2022/0171615 A1 | 6/2022 | Stewart | |

FOREIGN PATENT DOCUMENTS

| | | | |
|---|---|---|---|
| KR | 10-2004-0072017 | 8/2004 | |
| KR | 10-0728937 | 6/2007 | |
| WO | WO-0177856 A1 * | 10/2001 | ............ G06Q 30/02 |
| WO | WO 02-29605 A2 | 4/2002 | |
| WO | WO 2012/125852 A2 | 9/2012 | |
| WO | WO 2013/130735 A1 | 9/2013 | |
| WO | WO 2021/167789 A1 | 8/2021 | |

OTHER PUBLICATIONS

Cheng, Jacqui, Etsy users irked after buyers, purchases exposed to the world, Ars Technics [online], retrieved from https://arstechnica.com/information-technology/2011/03/etsy-users-irked-after-buyers-purchases-exposed-to-the-world/ on Dec. 23, 2022, and dated Mar. 14, 2011 (Year: 2011).*

U.S. Appl. No. 13/927,042, 2014/0012654, Systems and Methods of Sharing Promotional Information, filed Jun. 25, 2013.

U.S. Appl. No. 13/927,022, U.S. Pat. No. 10,475,059, Syndicated Sharing of Promotional Information, filed Jun. 25, 2013.

U.S. Appl. No. 15/367,079, Workflow Management System for Tracking Event Objects Associated With Entities and Secondary Entities, filed Dec. 1, 2016.

International Search Report; International Application No. PCT/US2013/047702, filed on Jun. 25, 2013 (dated Oct. 14, 2013).

International Search Report and Written Opinion; International Application No. PCT/US2021/016355, filed on Feb. 3, 2021 (dated Apr. 5, 2021).

Daukseviciut et al., "Loyalty Programmes for Small and Medium Enterprises Applied by the World's Safest Banks", Intelektine Ekonomika; Vilnius Iss. 4, 2011.

A. Metwlally, et al., On Hit Inflation Techniques and Detection in Streams of Web Adverstising Networks, 27th International Conference on Distributed Computing Systems (ICDCS '07), Toronto, ON, Canada, 2007, pp. 52-52, doi: 10.1109/ICDCS.2007.124 (Year: 2007).

M. Kantardzic, et al., Improving Click Fraud Detection by Real Time Data Fusion, 2008 IEEE International Symo Signal Processing and Information Technology, Sarajevo, Bosnia and Herzegovina, 2008, pp. 69-74, doi: 10.1109/ISSPIT.2008.4 (Year: 2008).

International Preliminary Report on Patentability and Written Opinion in PCT/US2021/016355, dated Aug. 23, 2022.

* cited by examiner

SYNDICATED SHARING OF PROMOTIONAL INFORMATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. application Ser. No. 13/927,022, titled "SYNDICATED SHARING OF PROMOTIONAL INFORMATION," filed on Jun. 25, 2013, which claims the benefit of priority under 35 U.S.C. § 119(e) of U.S. Ser. No. 61/668,384, filed on Jul. 5, 2012, and U.S. Ser. No. 61/702,635, filed on Sep. 18, 2012, the entire contents of which are incorporated herein by reference.

BACKGROUND

Social networking is a major medium of communications today. Individuals are able to broadcast messages to relatives, friends, acquaintances and the world through technologies such as the internet and mobile devices. Because of the rapid speed of communications offered by these technologies, individuals are able to reach an audience much larger than that reachable by traditional communications means.

Those offering products and services may wish to take advantage of the communication possibilities opened up by social networking.

SUMMARY

As a general matter, entities such as retailers may wish to reach wide audiences by transmitting promotional materials using computer network systems. Often it is advantageous to have promotional materials originate, or appear to originate, from entities that are trusted by the viewers of the promotional materials. For example, a person viewing a message relating to a product is more likely to be interested in the message (as indicated, for example, by clicking on a link in the message, or purchasing a product based on the message) if the message originates from a friend or acquaintance of the viewer. Furthermore, that viewer may also be more likely to be interested in the message about the product if the originator has more of a direct connection with the product (for example, the originator has purchased or tested the product), because the message is less likely to be viewed as a bare advertisement. Thus, it may be advantageous to create an appropriate environment so that such originators of product messages and other messages can be discovered and given incentives to spread effective messages. Some or all of these considerations motivate the various aspects and embodiments as disclosed herein.

Accordingly, presented herein are systems and methods that enable product (or service) purchasers, or other such entities, to share promotional materials via social networks and/or other means of communication and may further enable the purchasers to receive rewards, such as rebates, in response to interactions with the promotional materials by others (e.g., friends of the purchaser). In various embodiments, the promotional materials shared by the purchaser relates to the product purchased, which may lend greater credibility and/or interest in the promotional material being shared.

Additionally disclosed are systems and methods of syndication of such promotional materials to third-party distributors and revenue sharing of resulting rewards. For example, a purchaser who is offered a reward for sharing promotional materials may opt to allow third-party distributors to share those promotional materials, a desirable option if the purchaser lacks the desire and/or ability to sufficiently distribute those promotional materials. The distributors may then receive some or all of the associated reward (e.g., the purchase rebate) in exchange.

In one embodiment, a method of automatically awarding rebates to a purchaser of a product or service, by a computer system having one or more computer processors, an account of a purchaser of a product with purchase data including an amount paid by the purchaser for the product, comprises providing promotional material associated with a rebate promotion, the promotional material configured for posting on one or more social networking systems, calculating, by the computer system, a rebate per click to credit to the purchaser in response to respective clicks on the promotional material by respective viewers, calculating an allocation of the rebate per click between the purchaser and one or more third-party distributors of the promotional material, based at least in part on syndication parameters associated with the rebate promotion, receiving, at the computer system, indications that respective viewers have clicked on the promotional material, crediting the account of the purchaser an amount determined based on the calculated rebate per click, a quantity of the received indications of clicks from the respective viewers, and the syndication parameters, and crediting an account of the third-party distributor based on the calculated rebate per click, the quantity of the received indications of clicks, and the syndication parameters. In one embodiment, the syndication parameters are provided by a manufacturer or a retailer of the product. In one embodiment, the syndication parameters are provided by the purchaser. In one embodiment, the syndication parameters indicate a percentage of the rebate per click to be provided to a particular distributor in response to a viewer clicking on promotional material provided by the particular distributor. In one embodiment, the syndication parameters indicate one or more of a maximum quantity of distributors, a maximum portion of a total rebate that may be allotted to distributors, and/or limitations on placement of the promotional material by distributors. In one embodiment, the method further comprises determining, for each click, whether the click was in response to promotional material provided by the purchaser or promotional material provided by a particular third-party distributor. In one embodiment, the allocation of the rebate per click between the purchaser and one or more third-party distributors varies for certain clicks associated with the rebate promotion. In one embodiment, a total rebate provided to the purchaser in response to the purchaser alone providing the promotional materials that are clicked on by viewers is less than a total rebate allocated between the purchaser and one or more distributors in response to the purchaser and the one or more distributors providing the promotional materials that are clicked on by viewers. In one embodiment, the method further comprises in response to an indication from the purchaser that syndication is permitted, transmitting notifications to a plurality of potential distributors inviting the potential distributors to post promotional materials associated with the rebate promotion. In one embodiment, the potential distributors are automatically selected by the computing system based on demographic characteristics, previous activities posting promotional material, and/or associations with the purchased product of the potential distributors. In one embodiment, the potential distributors are selected based on previous purchases of a same and/or similar product as the product purchased by the purchaser. In one embodiment, promotional materials provided to distributors include respective identifiers associated with the particular distributor. In one embodiment, the method further comprises receiving, at the computer system, from a retailer offering the rebate promotion, a rebate percentage usable by the computer system to calculate maximum rebate amounts for respective purchases that qualify for the rebate promotion.

In one embodiment, a computing system comprises one or more computer storage devices configured to store software instructions, one or more computer processors configured to execute the software instructions in order to cause the computing system to associate an account of a purchaser of a product with purchase data including an amount paid by the purchaser for the product, provide promotional material associated with a rebate promotion to the purchaser and to one or more distributors, wherein the promotional material provided to each entity comprises a unique identifier of the entity, receive indications that respective viewers have clicked on the promotional material, for each interaction by a viewer with the promotional material, determine a source of the promotional material as a particular one of the distributors or the purchaser, and in response to determining that the source of the promotional material that was interacted with is a particular distributor, crediting the account of the purchaser and an account of the particular distributor based on predetermined syndication parameters indicating an allocation of a rebate per interaction between the purchaser and respective distributors. In one embodiment, the one or more distributors to which the promotional materials are provided are automatically selected by the computing system based on associations of the respective distributors with the product. In one embodiment, the interaction comprises one or more of a click on the promotional material, a purchase of the product, a purchase of another product from the retailer after clicking on the promotional material, and/or a posting of the promotional material by the distributor.

In one embodiment, a tangible computer readable medium stores software instructions configured for execution by a computing system having one or more computer processors, the software instructions configured to cause the computing system to provide promotional material associated with a rebate promotion to a purchaser of a product that qualifies for a rebate under the rebate promotion, provide promotional material to one or more distributors, wherein the promotional material provided to the purchaser and each of the one or more distributors comprises unique identifiers, receive indications that respective viewers have clicked on the promotional material, for each click of promotional material, determine a source of the promotional material as a particular one of the distributors or the purchaser, and in response to determining that the source of the click is a particular distributor, crediting an account of the purchaser and an account of the particular distributor based on predetermined syndication parameters indicating an allocation of a rebate per click between the purchaser and respective distributors. In one embodiment, crediting an account comprises electronically transferring money to a financial account. In one embodiment, crediting an account comprising increasing an amount owed without transferring money to the purchaser or the particular distributor. In one embodiment, the instructions are further configured to cause the computing system to electronically transfer to a financial account the amount owed on a daily, weekly, or monthly basis.

These and further embodiments are described in detail below.

DETAILED DESCRIPTION

Figure 1:
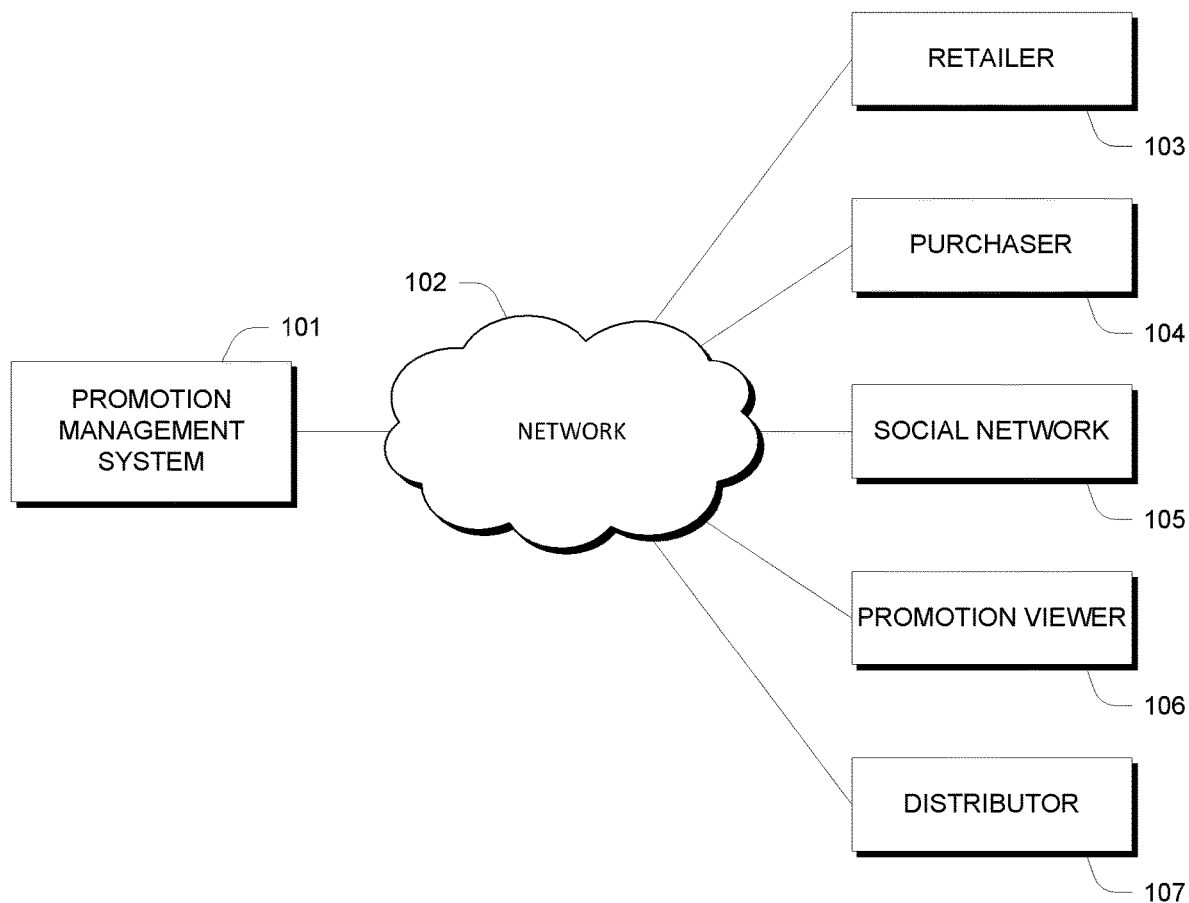
FIG. 1 is a block diagram of a network system including a promotional management system, as used in an embodiment.

FIG. 1 is a block diagram of a network system including a promotional management system, as used in an embodiment. The network system of FIG. 1 may include promotion management system 101 which may be one or more computing servers including computer hardware such as computer processors, volatile and/or nonvolatile storage, input/output devices, network communications devices and the like. In an embodiment, promotion management system 101 includes multiple computing devices connected via a distributed network. In an embodiment, promotion management system 101 includes a cloud computing system.

Promotion management system 101 may be connected to one or more networks 102. The networks may include, for example, any combination of the Internet, LANs, MANs, WANs, cellular communication networks, POTS networks, and so on. In an embodiment, promotion management system 101 communicates with networks 102 via a wired and/or wireless connection such as an Ethernet connection, a Wi-Fi connection, a cable connection, a T1 connection, a DSL connection, a cellular communications connection, and/or the like.

Network 102 may further be coupled with retailer 103, purchaser 104, social network 105, promotion viewer 106, and distributor 107. In an embodiment, each of retailer 103, purchaser 104, social network 105, promotion viewer 106, and distributor 107 includes one or more computing devices that are connected to network 102 by one or more of the connection technologies described previously and/or by another form of connection.

In an embodiment, each of retailer 103, purchaser 104, social network 105, promotion viewer 106, and distributor 107 may be controlled by one or more users. For example, retailer 103 may comprise a computing device operated by an owner of a retail store and/or an appropriate administrator related to a retail store. Purchaser 104 may be a computing device operated by one or more individuals purchasing products. Social network 105 may be a computing system operating a social network, website, or other related system and controlled by one or more system administrators and/or other users. Promotion viewer 106 may be a computing device operated by one or more individuals viewing promotional materials via a web browser or other application operating on the computing device. Distributor 107 may be a computing device operated by one or more individuals and/or entities distributing promotional materials on behalf of a purchaser 104. These and other terms, as used throughout this specification, may refer to the computing device and/or the user or operator of the device, in various embodiments.

Retailer 103 may be a computing device operated by a retailer of goods and/or services. Additionally and/or alternatively, retailer 103 may be any computing system offering services and/or any computing system operated by an entity offering products and/or services, including entities that are not technically retailers, such as wholesalers, individual sellers, etc. Retailer 103 may wish to connect to promotion management system 101 in order to provide rebate promotions to purchasers of products, services, and the like from the retailer 103.

Purchaser 104 may be a computing device operated by an individual who purchases items from retailer 103, purchases services from retailer 103 and/or otherwise engages in a transaction with retailer 103. Purchaser 104 may interact with the same computing device that is retailer 103, with another computing device operated by an entity relating to retailer 103, and/or directly with an entity relating to the computing device. In an embodiment, purchaser 104 may be offered a rebate as a result of making such a purchase or entering such a transaction with retailer 103. The rebate may be offered by retailer 103 and/or by another entity such as the manufacturer of the product purchased. The rebate may be offered in an embodiment in exchange for purchaser 104 propagating a promotion for retailer 103 and/or another entity.

Social network 105 may be a social networking system and/or other communication system. In various embodiments, social network 105 may be a user profile sharing system, a blog, a microblog, a content management system, a user contributed content system, a news website, a community news website, a community submitted content website, an email system, an email mailing list system, a webpage, a news group, and so on.

In an embodiment, purchaser 104 places promotional material relating to a product purchased from retailer 103 (or some other product or entity indicated by the particular promotion) on social network 105. For example, purchaser 104 may submit an entry to a blog relating to the promotion, send one or more emails relating to the promotion, send communications to friends relating to the promotion, and the like. In an embodiment, social network 105 may enable the content submitted by purchaser 104 to be redistributed on the same social network and/or on other social networks or communication media, thereby enabling the promotional material to potentially be distributed virally. The term "social network" may thus refer to a specific type of network service, such as a web site, or to other forms of communication within a network or multiple networks.

Promotion viewer 106 is an individual and/or computing device operated by the individual that receives and views the promotional content shared by purchaser 104. For example, promotion viewer 106 may receive an email message, SMS text, and/or other such communication from purchaser 104 including the promotional material. Alternatively, promotion viewer 106 may read the promotional material from the purchaser's website, blog, microblog, submitted content, public user profile, and the like. Promotion viewer 106 may then access content based on the promotional material such as, for example, clicking a link to a website identified in the promotional material (e.g., a website of the retailer 103 for the same and/or similar products as were purchased by the purchaser 104). In an embodiment, such a click and/or other access may cause the purchaser to receive all or a portion of the rebate offered by retailer 103 or other entity. In an embodiment, such access further directs promotion viewer 106 to content on a server offered by retailer 103 or another appropriate entity relating to the promotional material.

In some situations, a purchaser 104 may receive an offer for a rebate in exchange for distributing promotional materials, as described above, but may be unable or unwilling to distribute the promotional materials. For example, purchase 104 may choose not to be a member of social networking sites or may not have a sufficient number of contacts or relationships on those sites to claim a all or a significant portion of the offered rebate. In such cases, purchaser 104 may find it difficult or impossible to achieve a sufficient number of interactions with the promotional material to entitle the purchaser to a substantial rebate. In such situations, it would be advantageous for the promotion management system 101 to provide options such that the promotional materials will still be shared.

Thus, in an embodiment, the promotion management system 101 offers the purchaser 104 an option to "syndicate" rebate promotions. The process of syndication is discussed in detail throughout this specification. Briefly, a purchaser 104 may opt to syndicate a rebate, and where the purchaser does so, the promotion management system 101 enables third parties, such as distributors 107, to distribute the same or similar promotional materials on behalf of the purchaser 104. When a viewer 106 interacts with the promotional material posted by a distributor 107, then the rebate may be split between purchaser 104 and distributor 107.

As explained above, in various embodiments, promotions and/or promotional material may be shared, distributed, and otherwise provided. Promotional material may take on many different forms. For example, in various embodiments, promotional material may include branded content, advertisements, videos, images, texts, audio, product reviews, and the like. In an embodiment, promotional materials provided to the purchaser 104 are directly tied or otherwise related to a transaction performed by the purchaser 104, such as a purchase of a product and/or service from the retailer 103.

Figure 2:
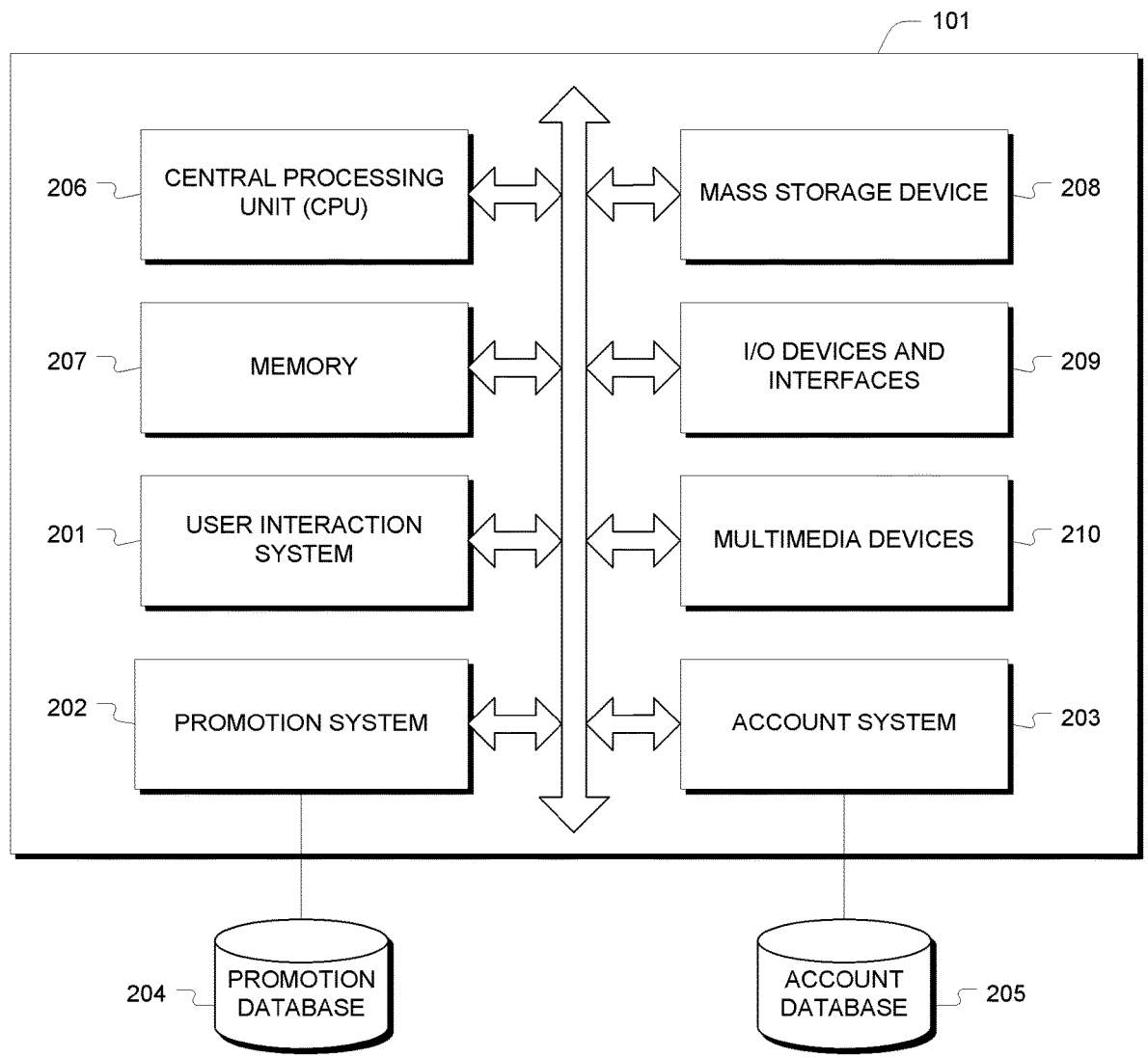
FIG. 2 is a block diagram of a promotion management system, as used in an embodiment.

FIG. 2 is a block diagram of a promotion management system, as used in an embodiment. Promotion management system 101 may be one or more computing devices, including computer hardware. Promotion management system 101 may further include one or more modules which may be implemented as executable instructions in software and/or hardware such as circuitry. Promotion management system 101 may further include data storage systems such as hard disks, read only memory, random access memory, flash memory, removable storage media, and the like.

Promotion management system 101 may include a user interaction system 201 which may be implemented as one or more software and/or hardware modules. In an embodiment, user interaction system 201 may be implemented on independent computing hardware. User interaction system 201 may be configured to handle one or more user interactions. Such user interactions may include, for example, requests to create promotions submitted for retailer 103 (e.g., setting up a new promotion on product X for the retailer 103), requests to engage in rebate promotion transactions initiated by purchaser 104 (e.g., the purchaser buys product X and signs up for the promotion set up by retailer 103), and/or requests to access promotional materials and/or locations identified in promotional materials made by promotion viewer 106 (e.g., a promotion viewer 106 views promotional material posted to social network 105 and clicks on a link).

Promotion system 202 may also be included in promotion management system 101. Promotion system 202 may be implemented as one or more software and/or hardware modules and may be operated on independent computing hardware. Promotion system 202 may be configured to manage promotions, such as rebate promotions. Thus, it may manage parameters and/or other information about current, past, and/or future promotions to be offered.

Promotion system 202 may further communicate with promotion database 204, for example to store and/or retrieve information about promotions. Promotion database 204 may be located within promotion management system 101 and/or located externally and accessed via one or more networks. Promotion database 204 may include in various embodiments a flat file store, a hierarchical file store, a SQL database store, an object oriented database, a multidimensional database, and so on.

Account system 203 may be included in promotion management system 101 and implemented as one or more software and/or hardware modules. In an embodiment, account system 203 may be operated on independent computing hardware. Account system 203 may be configured to manage one or more purchaser accounts. Such purchaser accounts may include personal information relating to purchasers associated with the promotion management system 101. Account system 203 may further maintain information relating to purchases made by respective purchasers and/or rebates earned by those purchasers. Account system 203 may store and/or retrieve such purchaser account data using account database 205. Account database 205 may be local to promotion management system 101 and/or located externally and connected via one or more networks. The account database 205 may be configured in any of the various ways described above with respect to promotion database 204, or in another manner, and account database 205 may be configured in the same manner or in a different manner with respect to promotion database 204.

The promotion management system 101 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the promotion management system 101 may be controlled by a proprietary operating system. Conventional operating systems control and schedule computer processes for execution, perform memory management, provide file system, networking, I/O services, and provide a user interface, such as a graphical user interface ("GUI"), among other things.

The promotion management system 101 may include one or more central processing units ("CPU") 206, which may each include one or more conventional or proprietary microprocessor(s). The promotion management system 101 may further include one or more memories 207, such as random access memory ("RAM"), for temporary storage of information, read only memory ("ROM") for permanent storage of information, and/or a mass storage device 208, such as a hard drive, diskette, or optical media storage device. The memory 207 may store software code, or instructions, for execution by the processor 206 in order to cause the computing device to perform certain operations, such as gathering sensor-related data, processing the data with statistical and/or predictive models, formatting data for user devices or other presentation, transmitting data, or other operations described or used herein.

The methods described and claimed herein may be performed by any suitable computing device, such as the promotion management system 101. The methods may be executed on such suitable computing devices in response to execution of software instructions or other executable code read from a non-transitory tangible computer readable medium or computer storage device. A computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The promotion management system 101 may include one or more input/output (I/O) devices and interfaces 209, such as a keyboard, trackball, mouse, drawing tablet, joystick, game controller, touchscreen (e.g., capacitive or resistive touchscreen), touchpad, accelerometer, and/or printer, for example. The promotion management system 101 may also include one or more multimedia devices 210, such as a display device (also referred to herein as a display screen), which may also be one of the I/O devices 209 in the case of a touchscreen, for example. Display devices may include LCD, OLED, or other thin screen display surfaces, a monitor, television, projector, or any other device that visually depicts user interfaces and data to viewers. The promotion management system 101 may also include one or more multimedia devices, such as speakers, video cards, graphics accelerators, and microphones, for example.

In the embodiment, the I/O devices and interfaces 209 provide a communication interface to various external devices via a network such as network 101 of FIG. 1. For example, the promotion management system 101 may be electronically coupled to the network 101 via a wired, wireless, or combination of wired and wireless, communication link(s). The network 101 may allow communication with various other computing devices and/or other electronic devices via wired or wireless communication links.

In an embodiment, the promotion management system 101 may include modules as described above with respect to user interaction system 201, promotion system 202, and account system 203, as well as other modules or fewer modules. Each of these modules is discussed in further detail below. In general, the word "module," as used herein, refers to logic embodied in hardware or firmware, or to a collection of software instructions, possibly having entry and exit points, written in any programming language, such as, for example, Java, Python, Perl, Lua, C, C++, C#, Objective C, etc. A software module may be compiled and linked into an executable program, installed in a dynamic link library, or may be written in an interpreted programming language such as, for example, BASIC, Perl, or Python. Software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the promotion management system 101, for execution by the computing device. Hardware modules may be comprised of connected logic units, such as gates and flip-flops, and/or may be comprised of programmable units, such as programmable gate arrays or processors. The modules described herein are typically implemented as software modules, but may be implemented in hardware, firmware and/or software. Generally, the modules described herein refer to logical modules that may be combined with other modules or divided into sub-modules despite their physical organization or storage.

Figure 3:
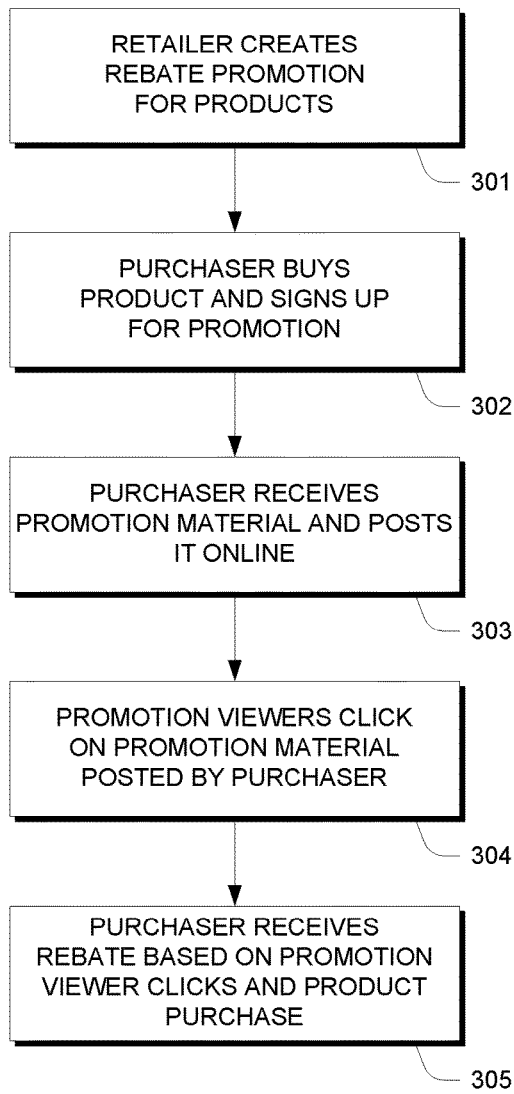
FIG. 3 is a flowchart of a process of providing a rebate promotion, as used in an embodiment.

FIG. 3 is a flowchart of a process of providing a rebate promotion, as used in an embodiment. In various embodiments, additional blocks may be included, some blocks may be removed, and/or blocks may be connected or arranged differently from what is shown.

At block 301, a retailer, such as retailer 103, creates a rebate promotion for one or more products. The rebate promotion may offer, for example, that a purchaser who purchases a product may receive a rebate of up to a certain percentage (e.g., of the cost of the product) and/or dollar amount, for example, in exchange for initiating interactions with promotional materials of the retailer by promotion viewers 106.

At block 302, a purchaser, such as purchaser 104, buys a product associated with the rebate promotion. The purchaser may then be offered the option to participate in the rebate promotion. If the purchaser signs up for the rebate promotion, then at block 303, the purchaser 104 may receive promotional material for posting at various locations online. The purchaser 104 may then post the received promotional material at various locations, such as social networks, websites, emails, and/or other locations.

At block 304, one or more promotion viewers such as promotion viewer 106 clicks on the promotional material posted by the purchaser 104 at block 303. As a result, at block 305, the purchaser may receive a rebate, based on the promotion viewers clicks form block 304 and further based on details of the rebate promotion established by the retailer 103, such as a per-click rebate provided to the purchaser 104 in response to each unique promotion viewer click on promotional material posted by the purchaser 104.

Depending on the promotion parameters of the particular rebate promotion, various interactions between promotion viewers and posted promotional materials may qualify to provide the purchaser with the rebates at block 305. For example, rather than clicking on a link in the promotional material, the promotion viewer may be required to make a purchase of a product, view content such as a video, complete a survey, or the like as indicated in the particular rebate promotion, in order to receive a rebate. In a further embodiment, a rebate may be granted to the purchaser when the promotion viewer chooses to participate in the rebate promotion as well, thereby creating a hierarchical rebate scheme.

Figure 4:
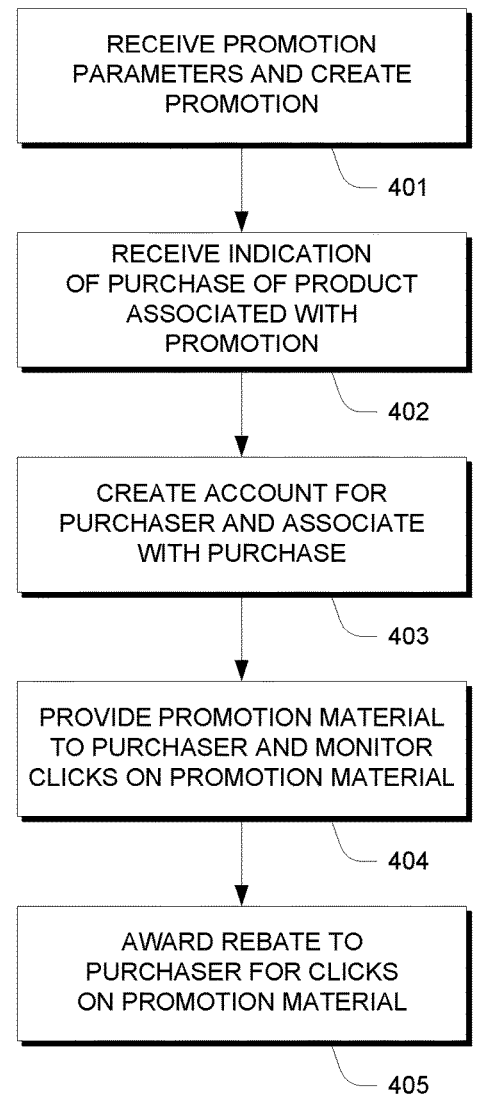
FIG. 4 is a flowchart of a process of offering promotions, as used in an embodiment.

FIG. 4 is a flowchart of a process of offering promotions, as used in an embodiment. The process may be performed, for example, by promotion management system 101 of FIG. 1. In various embodiments, additional blocks may be included, some blocks may be removed, and/or blocks may be connected or arranged differently from what is shown.

At block 401, the promotion management system may receive promotion parameters from a retailer for a rebate promotion. The promotion management system may then create and/or store a new rebate promotion. The appropriate promotion parameters may be stored in promotion database 204, for example, through operation of promotion system 202. The promotion parameters may include, for example, a maximum rebate (e.g., a percentage of a product purchase price and/or a maximum dollar amount), a quantity of interactions required to reach the maximum rebate, interactions that qualify for payment of at least a portion of the maximum rebate, information on various formats of promotional materials to provide to purchasers (such as text, images, audio, video, and/or other media), and/or other data that is used by the promotion management system to manage the rebate promotion.

At block 402, the promotion management system may receive an indication of a purchase of a product associated with the rebate promotion created at block 401. The received indication may originate from a purchaser of the product and/or from the retailer selling the product. In various embodiments, the indication may relate to a transaction other than a purchase of a product such as the purchase of a service. In response to receiving this indication, at block 403, the promotion management system may create an account for the purchaser (if an account does not already exist) and associates that account with the purchase or other transaction. In an embodiment, the promotion management system may determine that the purchaser has an existing account and may thus associate the purchase or other transaction with that existing account.

At block 404, the promotion management system may provide promotional material to the purchaser. The promotional material may be provided to the purchaser by being directly sent to the purchaser and/or by being automatically posted to third party locations such as social networking sites either automatically or at the request of the purchaser. The promotional material may be in various formats that are suitable for different delivery channels, such as a first promotional material formatted for delivery via email and a second promotional material formatted for posting on a microblog. In some embodiments, the purchaser is provided an opportunity to include a personal endorsement of the product for inclusion in the promotional material generated by the promotion management system.

The promotion management system may be configured to monitor clicks and/or other appropriate transactions relating to the promotional material. For example, a link in the promotional material may be directed to the promotion management system or associated computing system. Additionally or alternatively, the promotion management system may be configured to monitor activity on the locations to which the promotional material was posted, locations linked by the promotional material and/or other appropriate locations. Through such configuration, the promotion management system may thus be enabled to identify the occurrence of appropriate events that entitle the purchaser to rebates or other rewards.

At block 405, the promotion management system may award a rebate (e.g., a portion of a maximum rebate offered to a particular purchaser) to the purchaser. The type and/or quantity of rebate or award may be determined based on factors such as the promotion parameters received at block 401, the nature of the purchase at block 402, the nature of the purchaser, and/or the nature of the interaction with the promotional material at block 405. Thus, for example, the purchaser may receive a certain rebate each time a promotion viewer clicks on a link in the promotional material (e.g., until a maximum rebate is reached), and may then receive a larger rebate if the promotion viewer makes a purchase based on the promotional material.

Figure 5:
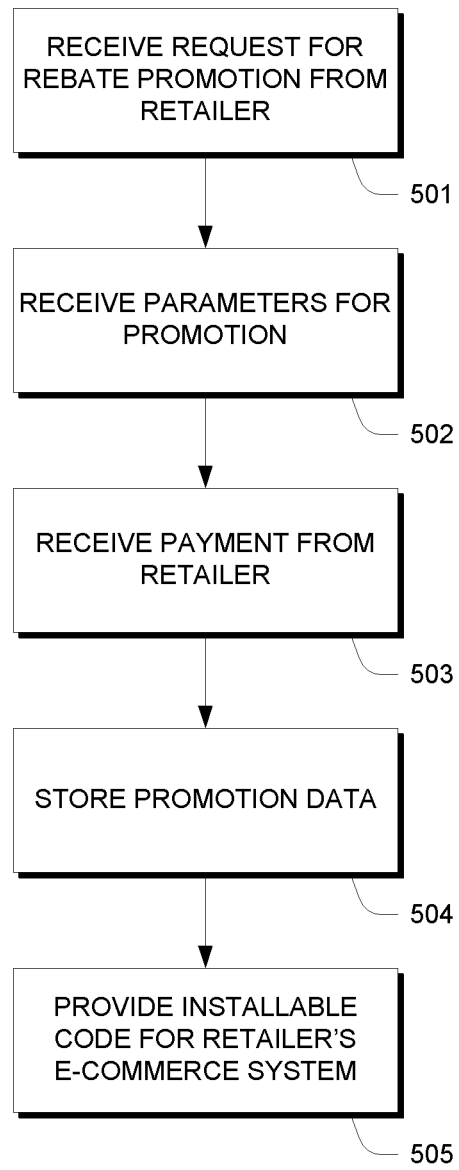
FIG. 5 is a flowchart of a process of creating a rebate promotion, as used in an embodiment.

FIG. 5 is a flowchart of a process of creating a rebate promotion, as used in an embodiment. The process may be performed, for example, at block 301 of FIG. 3 and/or block 401 of FIG. 4. The process may be performed, for example, by promotion management system 101 of FIG. 1. In various embodiments, additional blocks may be included, some blocks may be removed, and/or blocks may be connected or arranged differently from what is shown.

At block 501, the promotion management system receives a request for a rebate promotion from a retailer. The request may be transmitted, for example, through a network request such as an HTTP request. The request may be initiated directly by the retailer, by an entity associated with the retailer, by an operator of the promotion management server at the direction of a retailer or associated entity, and so on.

At block 502, the promotion management system receives parameters for the promotion to be created. Such promotion parameters may define the terms and/or scope of the promotion. Various examples of promotion parameters are described throughout the specification. The promotion parameters may be received simultaneously with the request for the rebate promotion at block 501 and/or subsequent to the request.

At block 503, the promotion management system receives payment from the retailer. The amount of payment may be determined based on the promotion parameters for the rebate promotion received at block 502. In an embodiment, the amount of the payment received from the retailer servers as a further parameter to the promotion, for example, by limiting the quantity of rebates offered to qualified purchasers. In various embodiments, the payment may be received at different times. For example, payment may be received on a periodic basis, such as a monthly basis. In various embodiments, the payment may be received before and/or after rebates have been given to purchasers. In an embodiment, the retailer is charged at the time a purchaser earns a rebate (for example, at the time a promotion viewer makes clicks on promotional material shared by the purchaser). In an embodiment, the retailer pre-pays for promotions, for example by maintaining a standing account balance with the promotion management system, so no payment need be deducted at the time of creating a particular promotion. In an embodiment, the timing of payment may be made flexible to accommodate the needs of various retailers, allowing the retailer to select from one of various payment options.

At block 504, the promotion management system stores appropriate promotion data based on the promotion parameters received at block 502 and/or payment received at block 503. Additionally, at block 505, the promotion management system may provide code (e.g., installable code) for the retailer's e-commerce system. Such code may enable the retailer to provide appropriate user interfaces to allow purchasers to be notified of and to enroll in rebate promotions offered by the retailer. In an embodiment, various installable plug-ins are provided in order to accommodate a variety of content management or shopping systems. In an embodiment, the code may include client site code, such as JavaScript code, and/or server site code.

The code provided at block 505 may include items specific to the rebate promotion and/or security related items. In an embodiment, the code may include one or more keys such as an API key, a promotion identifier, a retailer identifier, and the like. Other security information may include authentication credentials and/or cryptographic keys such as public and/or private keys. Thus, the information provided may enable the retailer, purchasers, and/or other entities to uniquely identify the retailer and/or promotion being offered.

In an embodiment, certain portions of the code are provided at block 505 and other portions are provided at different times and/or at different locations. For example, in an embodiment, the portions of the code specific to the rebate promotion are provided at block 505 and the non-specific portions, such as general code to interface with shopping cart or CMS software, are provided at a different time and/or location (for example, the nonspecific portions may be made available via an independent source code repository).

Figure 6:
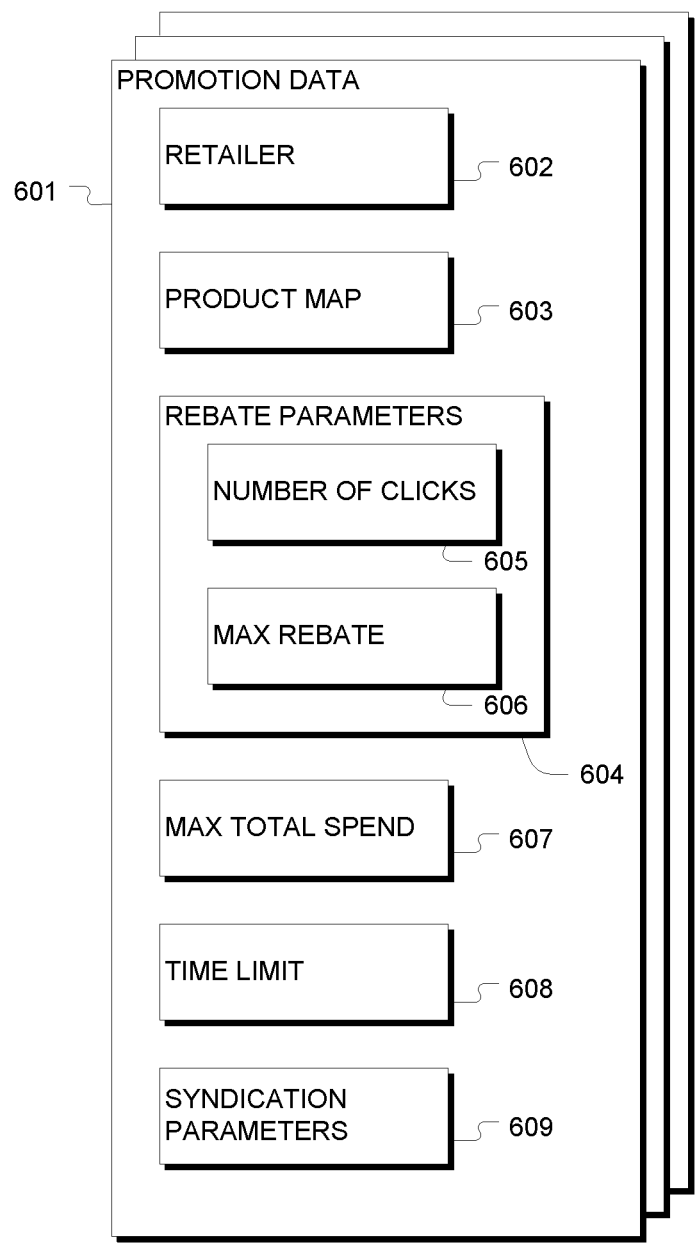
FIG. 6 is a block diagram of an example data structure of promotion data, as used in an embodiment.

FIG. 6 is a block diagram of an example data structure of promotion data, as used in an embodiment. Such a data structure may be used, for example, at block 504 of FIG. 5. The data structure may be stored, for example, in promotion database 204 of FIG. 2. The data structure may be stored on computer-readable media such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown.

Promotion data 601 may contain various data elements relating to rebate promotions. Promotion data 601 may include the same data as promotion parameters received from a retailer (such as those received at block 401 of FIG. 4), any subset of the promotion parameters, data derived from promotion parameters, and/or other data.

Promotion data 601 may include one or more data elements. For example, retailer data 602 may identify the retailer associated with a particular promotion. Product map 603 may include appropriate data to identify products that qualify for particular rebate promotions. Product map 603 may include, in various embodiments and/or situations, a list of products, a list of product categories, identifiers of product attributes, general rules for selecting products, and/or or the like. In an embodiment, all products offered by the retailer may be included in a promotion in which case product map 603 may be blank and/or otherwise identify all such products.

Rebate parameters 604 may include information relating to the rebates to be offered with the promotion. Such parameters may be used, for example, to determine the amount of the rebate to be offered. In an embodiment, rebate parameters 604 may include a number of clicks 605 and a maximum rebate 606 which may be a dollar amount and/or percentage. For example, in an embodiment, the number of clicks for a rebate may be set to 10 and the maximum rebate may be set to 20%. In such an embodiment, a purchaser would be able to obtain up to a 20% rebate if 20 clicks are made on the promotional material. If fewer than 20 clicks are made then a smaller rebate may be offered, with the magnitude of the rebate being determined by an appropriate formula or calculation.

In an embodiment, the partial rebate is determined by a linear interpolation based on the number of clicks received. Thus, in the example provided above, a purchaser may receive a 14% rebate if the promotional material is clicked 7 times. In other embodiments, the partial rebate may be determined by nonlinear formulas to encourage different promotion strategies. For example, in one embodiment, a purchaser may receive no rebate for zero to four clicks, a 5% rebate for five to nine clicks, and a 20% rebate for 20 or more clicks. In various embodiments, additional and/or different parameters, different rebate parameters may be used for determining the appropriate rebate. The parameters may include, for example, timing of clicks, types of individuals clicking, activities performed by promotion viewers (such as product purchases) and the like.

Promotion data 601 may further include limitations on the promotion. For example, promotion data 601 may include a maximum total spending amount 607 which may be used to limit the number and/or amount of promotions offered. The maximum total spending 607 may be a total maximum amount of spending, a maximum amount of spending per period such as per month, a maximum number of rebates to offer, a maximum number of rebates to offer per period such as per day, and so on. By comparing the number and/or amount of rebates offered by purchasers with the maximum total spending amount 607, the promotion management system may determine whether or not to offer further rebates to purchasers. For example, the promotion management system may calculate the total amount of rebates offered within a particular promotion and stop offering the rebate promotion if that amount exceeds the maximum total spending amount 607. In the case where some or all purchasers have received partial rebates but are still able to continue earning further rebates for additional clicks, the promotion management system may estimate a likely number of clicks to be obtained by those purchasers in order to calculate the current spending amount.

Promotion data 601 may further include one or more time limits 608. The time limits may be, for example, a time limit on the overall promotion and/or a time limit for a particular purchaser to earn rebates. The latter form of time limits may be useful for example to assist in the calculation of the total spending for a particular promotion. For example, if a time limit of 10 days is set, then a purchaser may receive rebates for up to that 10-day period but may not receive rebates thereafter for the same purchase. During that 10-day period, the promotion management system may assume that the full rebate and/or a partial rebate may be awarded to that purchaser and it may then disable further rebates due to a maximum total spending limit being hit. However, after that 10 day period, the promotion management system may determine that the purchaser has not earned the anticipated full or partial rebate, so it may be able to offer further rebates to purchasers while remaining within the maximum total spending limit. Thus, such time limits may enable the promotion management system to offer a greater number of rebates to purchasers within specified spending limits.

Promotion data 601 may further include syndication parameters 609. The syndication parameters may be used to determine whether syndication is permitted and/or the parameters for revenue sharing when syndication is used. In an embodiment, syndication parameters 609 include a syndication sharing percentage that may be used to determine the revenue sharing. Following the example from above, a promotion may offer a 20% rebate for up to 10 clicks on promotional materials posted by the purchaser, such that each click is worth a 2% rebate. The syndication sharing percentage may be 25%. Thus, when a viewer clicks on promotional materials shared by a distributor on behalf of a purchaser within this rebate promotion, the distributor would receive a 0.5% rebate, and the purchaser would earn a 1.5% rebate.

In various embodiments, the syndication sharing percentage may be fixed across some or all rebate promotions, and/or the syndication sharing percentage may be selected by the retailer creating the rebate promotion. The promotion management system may enable syndication across all rebate promotions, or retailers may be able to select whether to enable syndication for particular promotions. Additionally, the revenue sharing from syndication between distributors and purchasers may be a variable function rather than a fixed percentage.

Also in some embodiments, the revenue shared between a distributor and a purchaser may total more or less than the revenue that would ordinarily have been earned by the purchaser alone. For example, a rebate promotion such as that described above may provide a 2% rebate per click when the promotional material is shared by a purchaser, but when syndicated, the promotion may offer a 0.75% rebate per click to both the purchaser and the distributor. In this example, syndication of rebates may be discouraged; other percentages may be selected to encourage or discourage syndication as desired by the retailer and/or promotion management system.

Promotion data 601 may further include data relating to the promotional materials. For example, promotion data 601 may include images, promotional text, videos, audio, hyperlinks to one or more locations, and the like. Such material may be specified by retailers during the process of creating promotion data 601.

Figure 7:
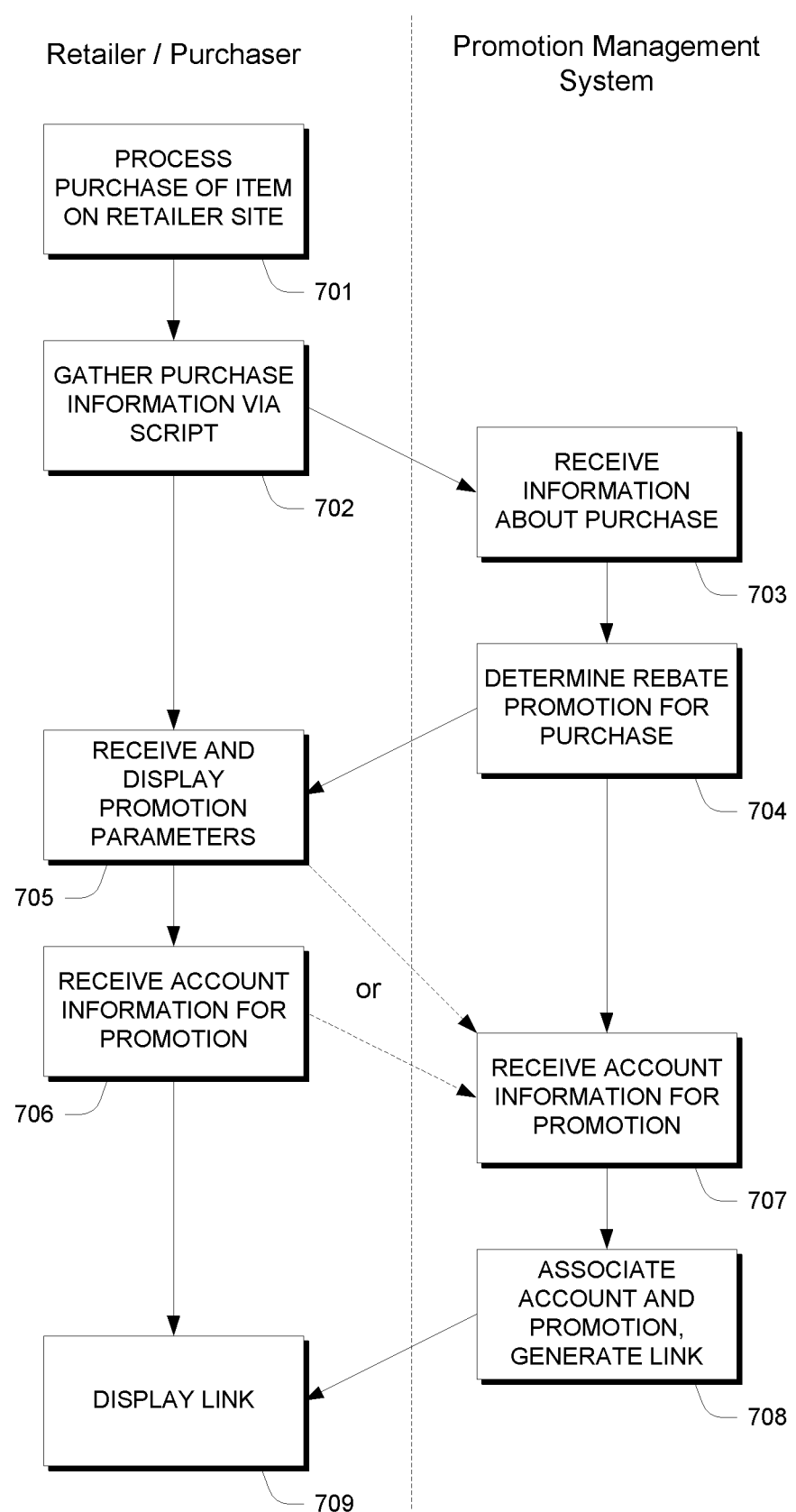
FIG. 7 is a flowchart of a process of managing a purchase of an item associated with a promotion, as used in an embodiment.

FIG. 7 is a flowchart of a process of managing a purchase of an item associated with a promotion, as used in an embodiment. In an embodiment, the process is performed at blocks 302 and 303 of FIG. 3, and/or blocks 402-404 of FIG. 4. In an embodiment, certain blocks of FIG. 7 are performed by retailer 103 and/or purchaser 104 and certain blocks are performed by promotion management system 101. In various embodiments, additional blocks may be included, some blocks may be removed, and/or blocks may be connected or arranged differently from what is shown.

At block 701, the retailer processes the purchase of an item on the retailer's site. Processing the purchase of an item may occur at the time when the purchaser viewed a shopping cart on the retailer's website, provides payment information, receives checkout confirmation, and/or another appropriate time.

At block 702, the retailer gathers purchase information via a script and/or other system operated by the retailer. In an embodiment, the purchase information is gathered by a client side script running on a web browser of the purchaser. The client side script may be included as part of a web page and/or other content sent by the retailer, and it may scrape and/or otherwise analyze the page or other content to determine appropriate information such as items purchased and/or amounts spent. In alternate embodiments, server side code, such as a plug-in, may be operated on the retailer's site or an associated site, to automatically gather the appropriate purchase information. Such plug-ins may be designed for existing content management systems, shopping cart systems, database systems and the like. The appropriate purchase information may then be sent via network and/or other means to the promotion management system.

At block 703, the promotion management system receives information about the purchase. The information may be received in response to a network transaction sent by the retailer and/or purchaser, or the information may be received upon the promotion management system sending an appropriate query to the retailer and/or purchaser, for example, on a periodic basis. The information about the purchase may include information about items purchased and/or amounts spent. The information about the purchase may further include information relating to a particular promotion. Such information may include, for example, a promotion ID, a retailer ID, an API key, security credentials, and the like.

At block 704, the promotion management system determines a rebate promotion for the purchase. The rebate promotion data may be structured, for example, in the form shown in FIG. 6. The determination may be performed, for example, by promotion system 202 of FIG. 2. In an embodiment, the promotion management system may determine that multiple promotions are appropriate for a given purchase, for example, when two items associated with different promotions are purchased. Upon determining the appropriate rebate promotion, the promotion management system determines appropriate parameters associated with the promotion and sends those to the retailer and/or purchaser. Such parameters may include, for example, a rebate percentage and/or dollar amount and/or a number of clicks required to obtain the maximum rebate amount.

At block 705, the retailer and/or purchaser receives and displays the promotion parameter received from the promotion management system. In an embodiment, the promotion parameters are displayed on the retailer's webpage. Additionally or alternatively, the promotion parameters may be sent to the purchaser by email and/or other communication. The purchaser may then be given the option to sign up for the promotion. In an alternate embodiment, the purchaser may be automatically signed up for the promotion without any required interaction by the purchaser.

If the purchaser chooses to participate in the promotion, then at block 706, account information is received for the promotion. The account information may be manually entered by the purchaser and/or automatically drawn from the retailer's systems. The account information may be received by the retailer and then transmitted to the promotion management system, or it may be received directly at the promotion management system, for example, by a website form submission, as shown in block 707.

At block 708, the promotion management system creates an account for the purchaser based on the received account information. If an account already existed for the purchaser, then that account may be used rather than creating a new account. The account is associated with the promotion to enable the purchaser to earn rebates based on that promotion. The promotion management system may then generate appropriate promotional materials such as a promotion link. The promotional material is then sent to the retailer and/or purchaser, for example, it may be displayed on the retailer's website and/or sent to the purchaser by email or other communication.

In an embodiment, the promotion link is a short URL link directed to the promotion management system and/or an associated computer system. The short link may include identifiers, for example in the path and/or query parameters of the URL, that may identify the retailer, rebate promotion, purchaser, and/or other relevant information. In an embodiment, the short link may instead include an identifier that links to a database record or other record stored in the promotion management system, allowing the system to identify the retailer, rebate promotion, purchaser, and/or other relevant information without some or all of that information being directly identified in the short link.

Figure 8:
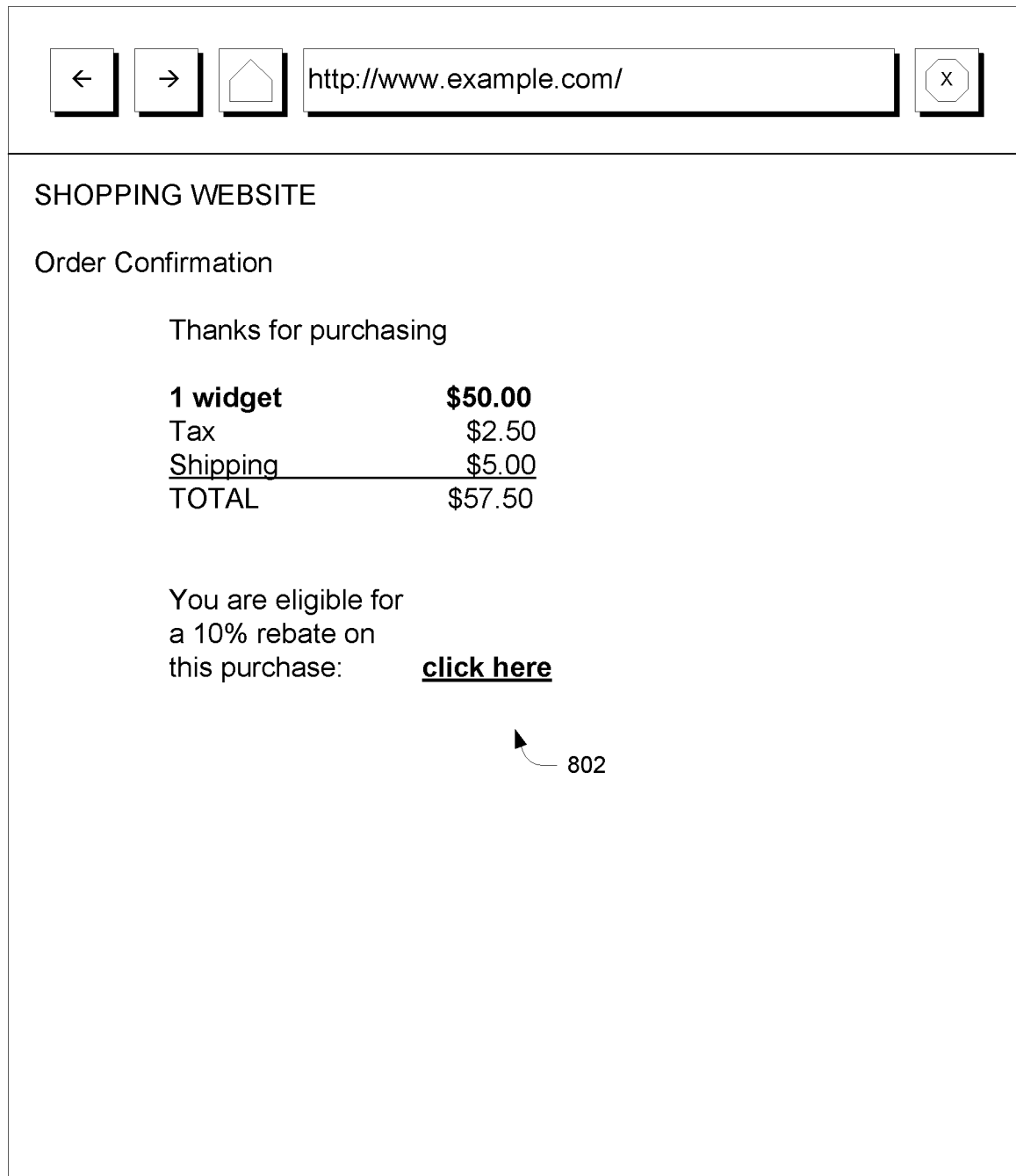
FIG. 8 is a sample user interface enabling a purchaser of a product on a retailer's website to participate in a rebate promotion, as used in an embodiment.

FIG. 8 is a sample user interface enabling a purchaser of a product on a retailer's website to participate in a rebate promotion, as used in an embodiment. User interface 801 may be, for example, a webpage displayed on a web browser operated by the purchaser.

User interface 801 may be, in an embodiment, an order confirmation page. In various embodiments, the webpage may be a different webpage at a different part of the shopping process, such as a checkout page, a shopping cart page, a payment entry page or the like. Link 802 on the user interface enables the purchaser to participate in the rebate promotion by clicking on the link. In various embodiments, rather than a clickable link, other user interface elements may be employed such as a check box, a touchable button, a slideable button, a text entry field, and so on. The user interface may further indicate information relating to the rebate promotion such as text indicating the amount of the rebate.

Figure 9:
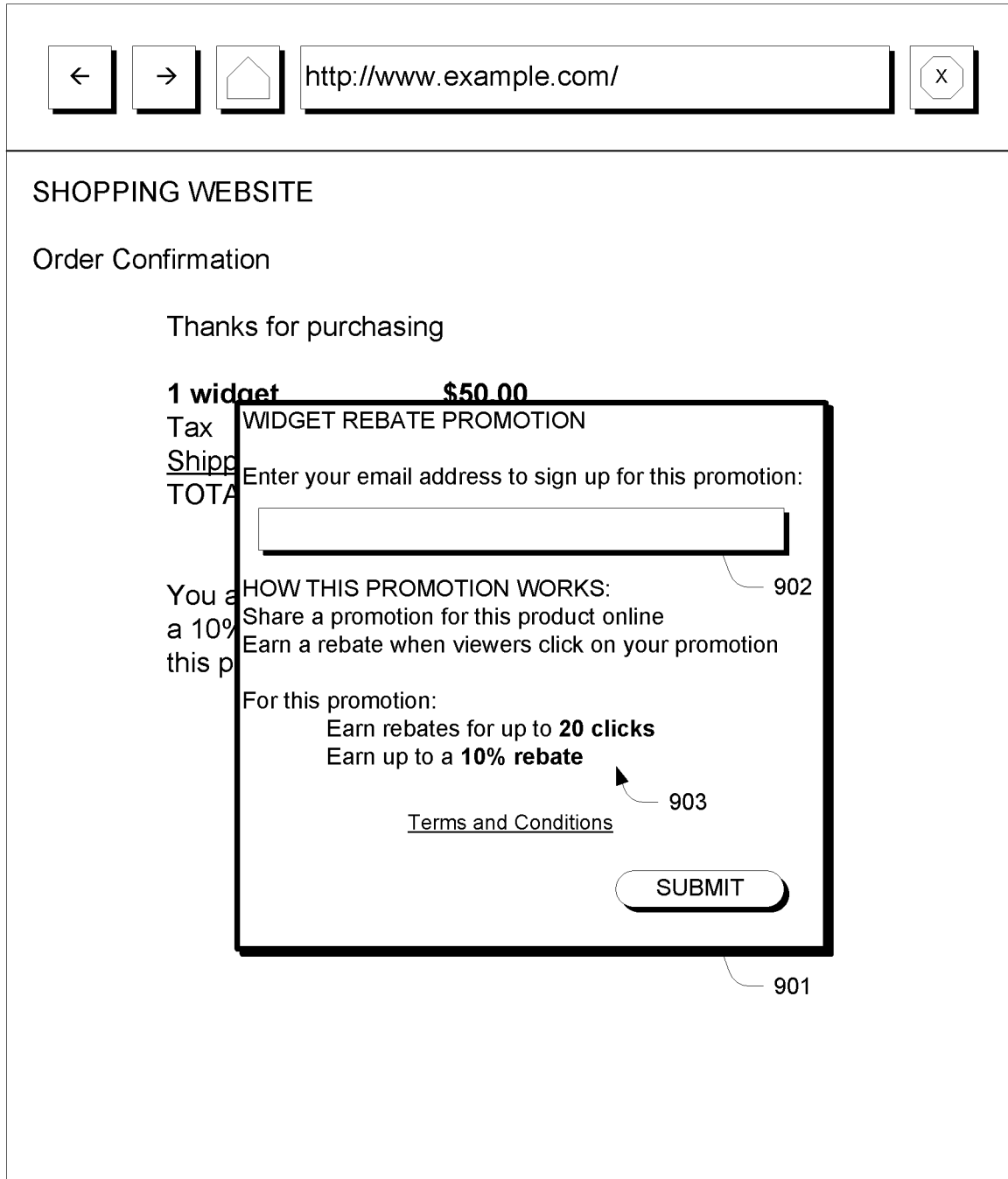
FIG. 9 is a sample user interface allowing the purchaser to sign up for a rebate promotion, as used in an embodiment.

FIG. 9 is a sample user interface allowing the purchaser to sign up for a rebate promotion, as used in an embodiment. The user interface may include user interface element 901 which may be displayed as a popup window, as an internal frame within a webpage, as a separate webpage or the like. The interface may include an input control configured to receive purchaser information, such as text field 902 that is configured to receive the purchaser's email address. In an embodiment, the email address may be automatically drawn from the retailer's data and/or from another data source so that the email address may be automatically included in text field 902 or otherwise automatically provided to the promotion management system. In an embodiment, the user may be able to change the email address through text field 902 or other interface elements thereby enabling the user to use different email addresses for the rebate promotion and for the retailer sites. In various embodiments, information different from or in addition to the email address may be requested by the promotion management system using interface element 901 or another interface.

User interface element 901 may further include information about the rebate promotion 903. Such information may include the number of clicks and/or other actions that can earn rebates. It may further include the percentage and/or dollar amount of the rebate. It may further include other information about the rebate promotion such as a time limit. Information about the rebate promotion may be displayed directly in user interface element 901 and/or on a separate page such as a terms and conditions page which may be linked within user interface element 901.

In an embodiment, rather than displaying user interface element 901 or other interface to receive purchaser information for a rebate promotion, the retailer and/or promotion management system may simply accept the request to participate in the rebate promotion through an interaction with interface element 802 of FIG. 8. Thus, for example, the retailer may simply store, in a database, an indication that a purchaser has indicated interest in participating in a rebate promotion. The retailer may then inform the promotion management system about the purchaser, and/or the promotion management system may periodically or otherwise query the retailer for purchasers who have indicated interest in participating in the rebate promotion. The promotion management system and/or retailer may then contact the purchaser, for example by email, without the need to display an interface such as user interface element 901. The retailer and/or promotion management system may determine the email address of the purchaser using the retailers existing database records, or from user input provided during the shopping cart checkout process.

Figure 10:
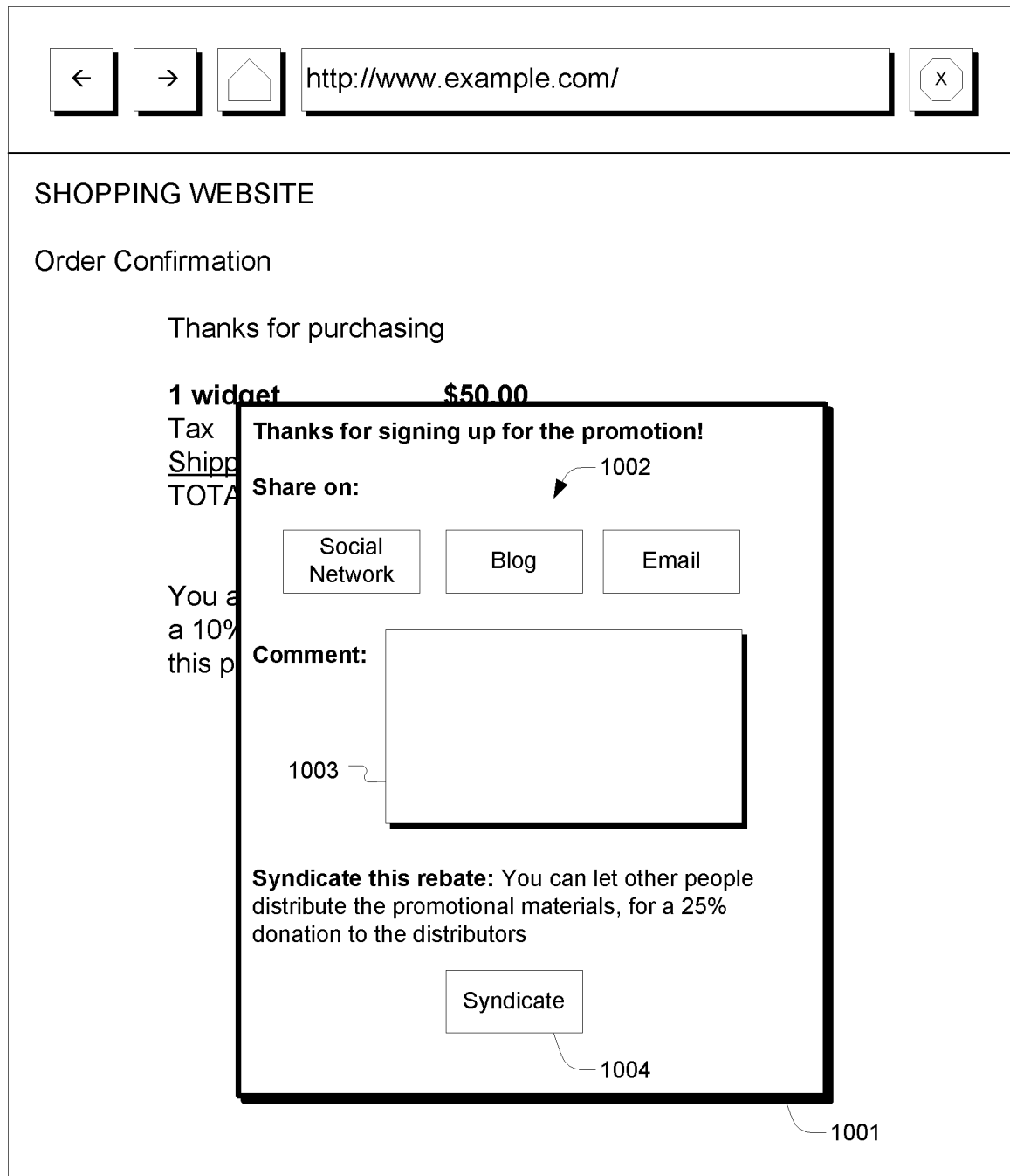
FIG. 10 is a sample user interface for sharing promotional materials as used in an embodiment.

FIG. 10 is a sample user interface for sharing promotional materials as used in an embodiment. The interface of FIG. 10 may be displayed, for example, subsequent to the interface shown in FIG. 9. In various embodiments, the interface may be displayed on the retailer's webpage in a popup window, in a separate window, on a separate webpage, and/or in another communication such as an email communication. User interface element 1001 may include information relating to the rebate promotion for which the purchaser has signed up. The example user interface element 1001 includes various buttons 1002 and/or other interface elements that enable the purchaser to share the promotional material at various locations such as a social network, a blog, and/or emails. In an embodiment, when a purchaser clicks or otherwise selects one or more of interface elements 1002, the promotion management system automatically posts the appropriate promotional material to the selected location. In an embodiment, the promotional material is specifically customized based on the location to which it will be posted so that, for example, promotional material posted on a social network may be formatted different from promotional material sent by email. In an embodiment, the promotional material comprises a link that may be provided directly to the purchaser so that it may be posted by the purchaser at the purchaser's discretion. In an embodiment, the link or other promotional material is not directly provided to the purchaser, thus providing a degree of control over the posting of the promotional material. In such an embodiment, the links and/or other promotional material may be automatically embedded within the various options.

In an embodiment, when the purchaser selects one or more of interface elements 1002, the purchaser's browser automatically executes client side code to post the promotional material to the appropriate location. In such a case, neither the promotion management system nor the retailer needs to communicate with external systems in order to post the promotional material.

User interface element 1001 may further include a comment block 1003 so that the purchaser may include a customized comment. In an embodiment, when the purchaser provides a customized comment that comment may be automatically included in the posting of promotional material. In various embodiments, the comments provided in block 1003 may be formatted appropriately for the location to which the promotional material is being posted. The comment block may enable the purchaser to provide customized messages to particular individuals, reviews of the product, personalized recommendations, and so forth. Such comments may thus increase the efficacy of the promotional materials in attracting attention and/or interest by viewers. In various embodiments, purchaser feedback other than or in addition to a comment may be solicited, such as a star rating, a like/dislike indication, a list of tags, and so on.

User interface element 1001 may further include option 1004 to syndicate the rebate. This option may be shown based on whether syndication is available for the rebate promotion. By selecting option 1004, the promotion management system or other appropriate system may record the purchaser's desire to syndicate the rebate promotion for the purchaser. The promotion management system or other appropriate system may further perform steps in furtherance of the syndication, such as notifying potential distributors of the syndicated rebate promotion. The user interface may further identify the revenue sharing scheme for syndication: user interface element 1001, for example, indicates that 25% of the rebate will go to distributors if the rebate promotion is syndicated.

Figure 11:
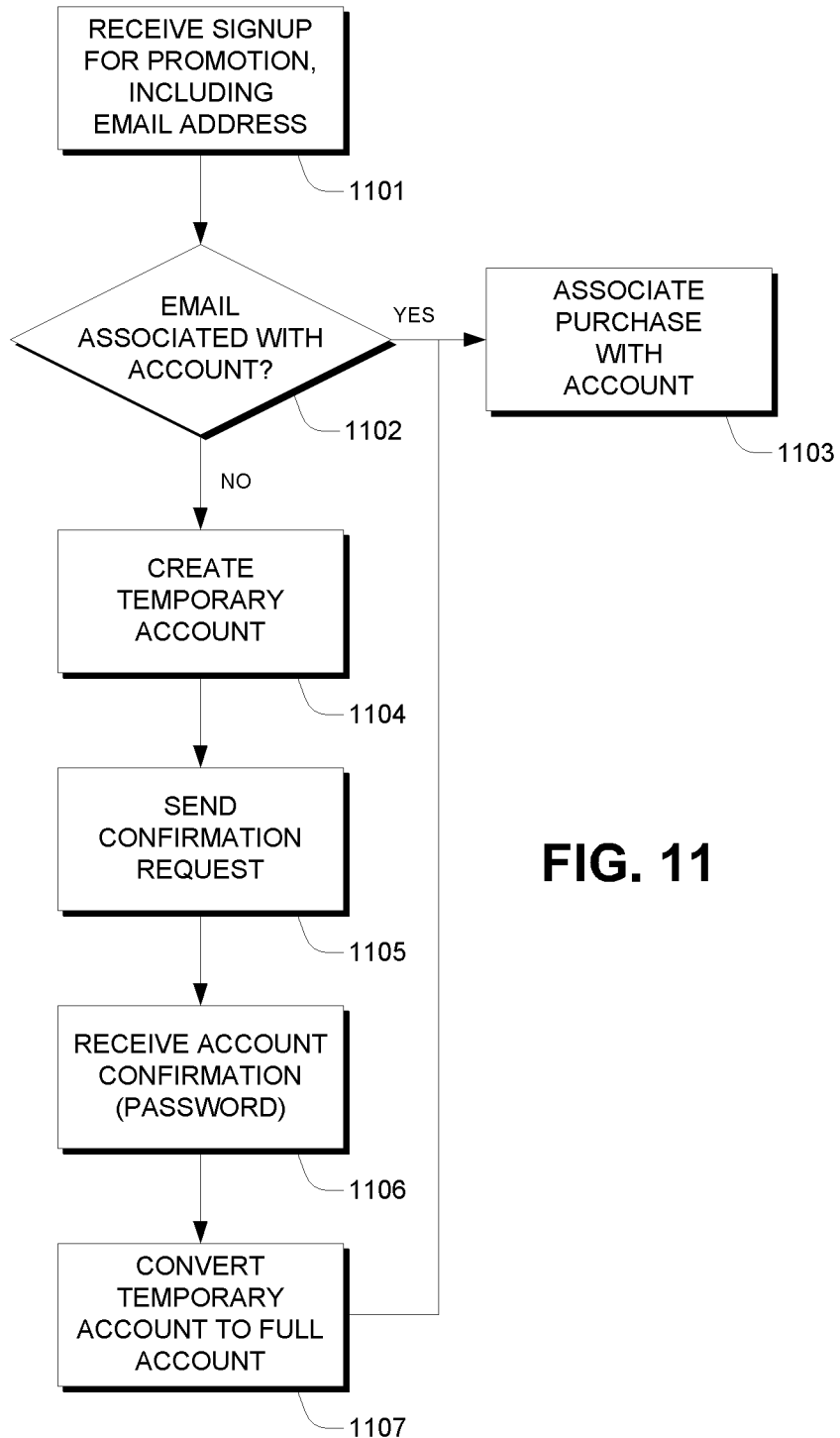
FIG. 11 is a flowchart of a process of participating in a promotion, as used in an embodiment.

FIG. 11 is a flowchart of a process of participating in a promotion, as used in an embodiment. The process may be performed, for example, at blocks 707 and 708 of FIG. 7. The process may be performed, for example, by promotion management system 101 of FIG. 1. In various embodiments, additional blocks may be included, some blocks may be removed, and/or blocks may be connected or arranged differently from what is shown.

At block 1101, the promotion management system receives sign-up information for a promotion. The sign-up information may include information such as an email address which may be used to identify the purchaser who is signing up for the promotion. The sign-up information may further include information such as a promotion ID, promotion information, and API key, a retailer ID, other user identifier, identifiers of products purchased, indications of amounts spent, and so on.

At block 1102, the promotion management system determines whether the received email address or other user identifier is associated with an existing account. If so, then at block 1103, the purchase made by the purchaser is associated with that identified account.

If the email address is not associated with an existing account, then at block 1104, a temporary account is created. The temporary account information may be stored, for example, in account database 205 of FIG. 2. The purchase may then be associated with this temporary account. Thus, the temporary account may be used to keep track of clicks by promotion viewers or other transactions that entitle the purchaser to a rebate.

At block 1105, a confirmation request is sent to the email address associated with the temporary account. The confirmation request may provide a link to the purchaser enabling the purchaser to confirm that the email address is active and that the purchaser wishes to participate in the rebate promotion. The purchaser may then access the provided location and provide account confirmation such as a password at block 1106.

Upon receiving the account confirmation at block 1106, the promotion management system may then convert the temporary account to a full account at block 1107. The full account is then associated with the purchase, thus enabling the purchaser to earn rebates through the rebate promotion. In an embodiment, the temporary account is set to expire after a predetermined period, thus ensuring that inactive temporary accounts are not retained indefinitely. The predetermined period may correspond, for example, to a time limit associated with the promotion.

Figure 12:
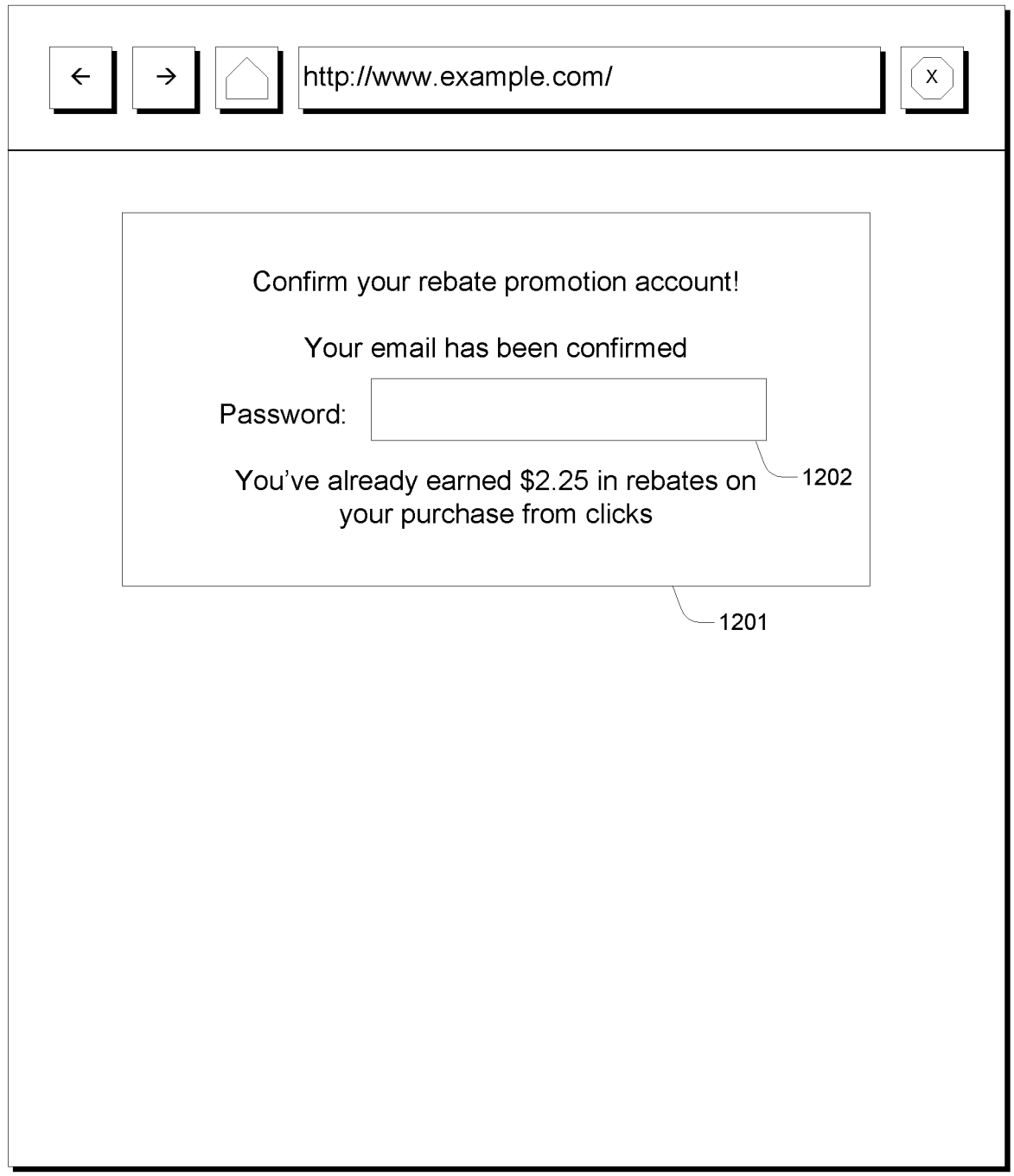
FIG. 12 is a user interface for confirming an account with the promotion management system, as used in an embodiment.

FIG. 12 is a user interface for confirming an account with the promotion management system, as used in an embodiment. The interface may be displayed, for example, at block 1106 of FIG. 11.

The interface may include box 1201 which requests the purchaser to confirm the created rebate promotion account. In order to confirm the account in an embodiment, the purchaser may provide a password in field 1202 or other appropriate information. Such confirmation may ensure that the provided email account is active and that the purchaser indeed wishes to participate in the rebate promotion.

The interface may further indicate a percentage or dollar amount of a rebate already earned prior to the account being confirmed. As explained with regard to FIG. 11, a temporary account may be able to track rebates earned by the purchaser even prior to account confirmation, and those earned rebates are transferred to the full account upon account confirmation. Such a display of the amount of rebate already earned may assist in incentivizing the purchaser to complete the confirmation process using an interface such as that shown in FIG. 12.

In an embodiment, if the purchaser does not confirm the account within a certain period of time, then communications such as email messages are sent to the purchaser to remind the purchaser of the rebate promotion and optionally to inform the purchaser of the amount of the rebate already earned. Such reminder emails may serve to further increase participation among purchasers in the rebate promotion and to avoid earned rebates from being discarded due to lack of account confirmation.

Figure 13:
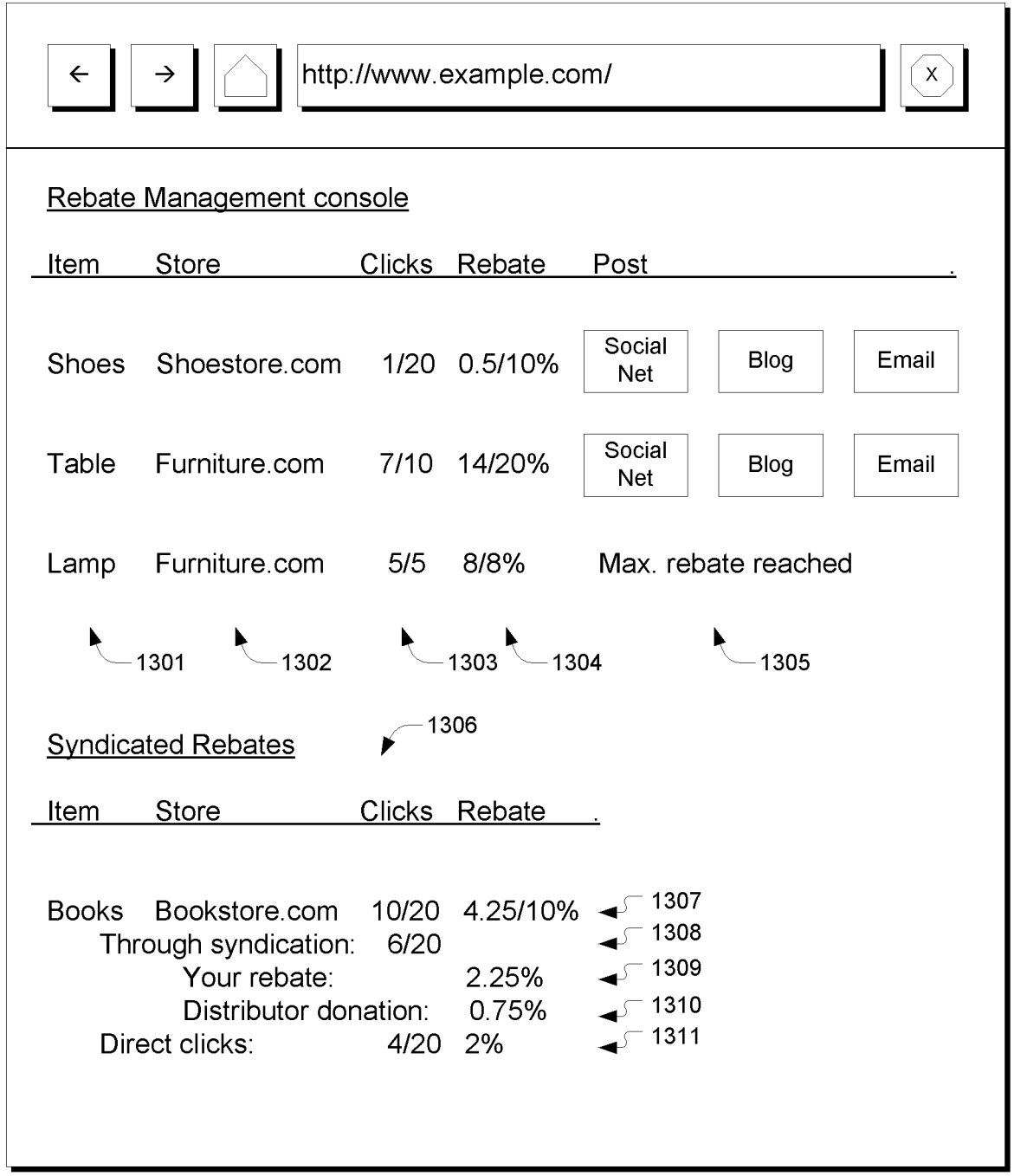
FIG. 13 is a user interface of a rebate promotion management console, as used in an embodiment.

FIG. 13 is a user interface of a rebate promotion management console, as used in an embodiment. The rebate management console may include information about ongoing rebate promotions in which a purchaser is participating. The purchaser may access the rebate management console, for example, by logging into an appropriate website operated by the promotion management system or associated system.

The rebate management console may identify information such as items purchased 1301, store or other entity from which the item was purchased 1302, number of clicks by promotion viewers on promotional material from the purchaser 1303, total number of clicks available 1303, percentage of rebate earned 1304, maximum rebate percentage 1304, dollar amount earned (not shown in this embodiment), maximum rebate dollars (not shown in this embodiment), and/or other such information. The rebate management console may further include options enabling the purchaser to further post promotional materials relating to particular promotions at various locations such as social networks, blogs, email messages and the like. In an embodiment, where the maximum number of clicks has been reached and/or the maximum rebate amount has been earned, the rebate management console may indicate such and/or prevent further posts of the promotional material from being created. In an alternate embodiment, the purchaser may still be able to post the promotional material even though the maximum rebate has been reached with the understanding that clicks by promotion viewers will not earn further rebates.

The rebate management console may further include details relating to rebate syndication, in table 1306 and/or elsewhere. The syndication details may be displayed separately, as shown in FIG. 13, or those details may be incorporated with the information relating to non-syndicated rebates.

In the embodiment shown in FIG. 13, the purchaser has made a purchase of books and has syndicated the corresponding rebate promotion, which offered a maximum 10% rebate for 20 clicks, as shown in entry 1307. One or more distributors have posted the promotional materials relating to this rebate promotion, and they have garnered six clicks, as shown in entry 1308. In this example, 25% of the rebate earned for those six clicks is awarded to the distributors, and the balance is awarded to the purchaser. Thus, entry 1309 indicates that the purchaser has earned a 2.25% rebate, and entry 1310 indicates that the distributors have been awarded a 0.75% rebate.

Different information may be displayed in various embodiments. For example, the identities of particular distributors may be displayed or hidden, possibly for privacy concerns. The cash value of rebates may be displayed, rather than percentages. The posting options 1305 may be included.

The purchaser may also earn rebates by posting promotional materials directly, rather than through a distributor, and receiving clicks on those directly posted promotional materials. Thus, entry 1311 shows, following the above example, that there have been four clicks on promotional materials directly posted by the purchaser, earning the purchaser a 2% rebate. The revenue may be entirely allocated to the purchaser since the clicked promotional materials were directly posted by the purchaser.

It is noted that promotional materials may be "directly posted" by a purchaser even though those promotional materials may be linked, reposted, or otherwise redistributed by third parties. For example, a purchaser may post promotional materials on a social network, and the purchaser's friends may repost those materials on other social networks. In an embodiment, clicks on the reposted materials are credited to the purchaser, so that the friends are not considered distributors and are not allocated a share of the rebate. This may be because the reposted materials include a unique identifier, such as a link URL, associated with the originally posted promotional materials. In other embodiments, the third parties who redistribute promotional materials may be awarded a share of the rebate and/or an additional rebate.

Figure 14:
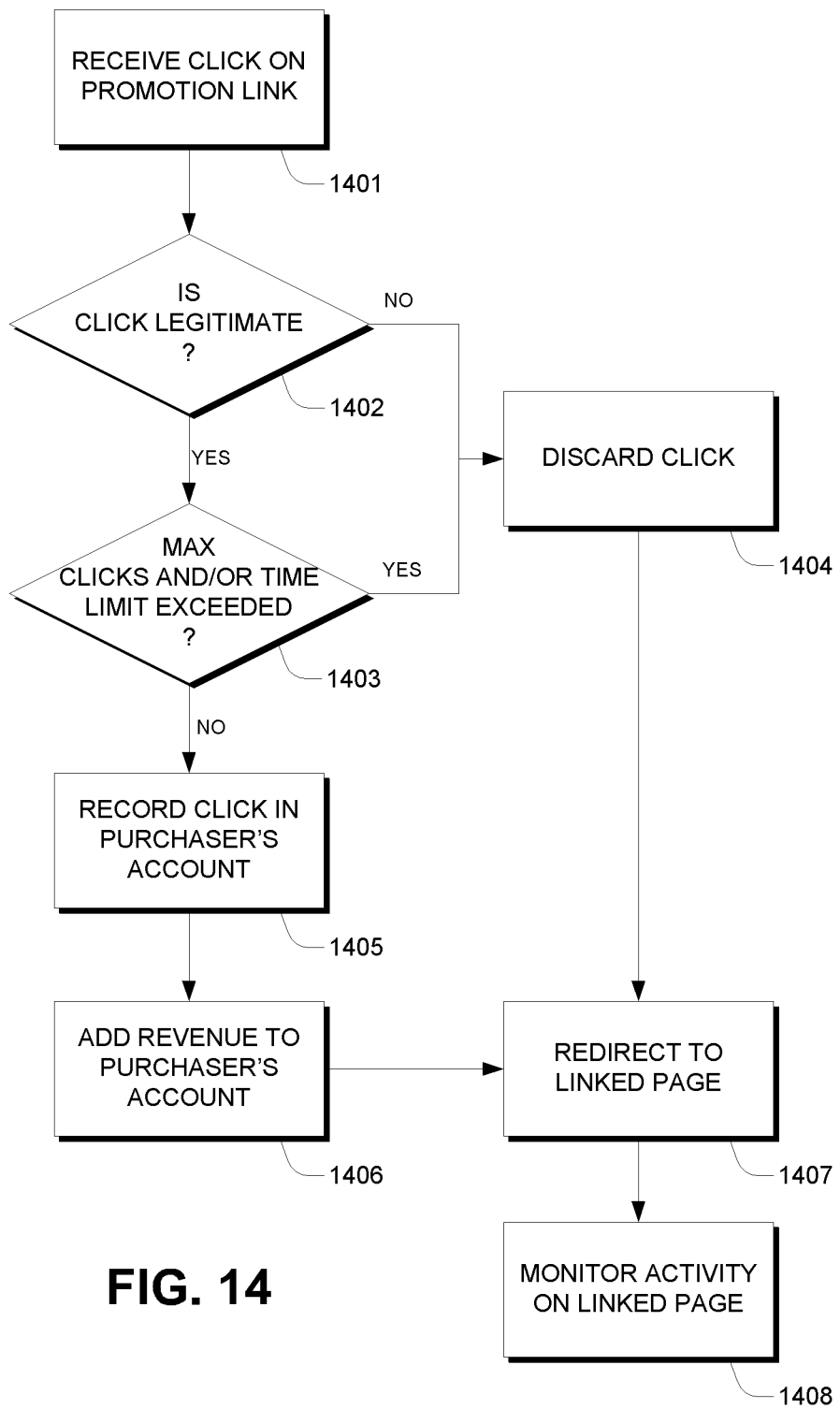
FIG. 14 is a flowchart of a process of handling clicks on promotional materials as used in an embodiment.

FIG. 14 is a flowchart of a process of handling clicks on promotional materials as used in an embodiment. The process may be performed, for example, at blocks 304 and 305 of FIG. 3, and blocks 404 and 405 of FIG. 4. The process may be performed, for example, by promotion management system 101 of FIG. 1. In various embodiments, additional blocks may be included, some blocks may be removed, and/or blocks may be connected or arranged differently from what is shown.

At block 1401, the promotion management system receives a click on a link in promotional material. The click may be received, for example, through an HTTP and/or other request directed to the promotion management system and/or an associated computer system. In various embodiments, other activities other than clicks on promotional materials may be monitored such as product purchases, video views, survey completions, and so on.

In an embodiment, the promotion management system may determine information based on the click received at block 1401. Such information may include, for example, the identity of the retailer purchaser and/or rebate promotion associated with the click. In an embodiment, the determination of any one or more of these identities may be made based on information included with the click such as URL query parameters. In an embodiment, the information may be determined based on the URL of the request made by the click. The URL may be associated within the promotion management system with a database record identifying the rebate promotion, the retailer, and/or the purchaser. Based on this information, the promotion management system may credit the appropriate purchaser for the click.

At block 1402, the promotion management system may determine whether or not the click or other transaction is legitimate. Such a determination may be made using various information about the click such as the timing of the click, the address from which the click originated, the relation of the click to other clicks, and so on. The determination may be made using a variety of techniques such as statistical modeling, Bayesian analysis, spam filtering, behavioral analysis, and so on. If the click is not legitimate, then at block 1404, it may be discarded. In an embodiment, the determination of whether or not a click is legitimate may be made at a later time such as on a periodic basis. In such a case, rebates may be retracted as a result of a later determination that a click is not legitimate. In an alternate embodiment, clicks may be held in a pending state until the determination has been made.

At block 1403, the promotion management system determines whether a maximum number of clicks for the promotion has been exceeded. For example, if a rebate promotion specifies that a purchaser may earn rebates for up to 20 clicks, then the promotion management system may determine at block 1403 whether the purchaser associated with a particular click has already been credited for that number of clicks on the promotional material. Additionally or alternatively, the promotion management system may further conduct other tests to determine whether or not the click should result in the purchaser being credited with a rebate. For example, the promotion management system may determine whether a time limit for the promotion has expired. If the conditions are not met, then at block 1404, the click may be discarded.

At block 1405, the promotion management system records the click in the purchaser's account. At block 1406, the appropriate revenue is calculated and added to the purchaser's account. The calculation of the revenue to be added may be based on the appropriate rebate parameters or other promotion data as shown in FIG. 6.

In an embodiment, the amount of revenue added to the purchaser's account is based on the promotion data for the appropriate rebate promotion and, in particular, based on a linear interpolation calculated from the maximum rebate and the number of clicks associated with the promotion. For example, the revenue added to the purchaser's account may be calculated based on the maximum rebate percentage for the promotion divided by the number of clicks and multiplied by the purchase amount.

In various embodiments, depending on the particular rebate promotion, other methods of calculation may be used. For example, a nonlinear rebate scheme such as a quadratic rebate scheme may be used so that earlier clicks earn smaller revenue while later clicks earn greater revenue. Alternately, a scheme such as a logarithmic scheme may be used so that earlier clicks earn more revenue while later clicks earn less revenue. Regardless of the form of calculation, the rebate amount may be calibrated such that the total rebate does not exceed the maximum rebate.

At block 1406 the promotion management system may further determine whether the click received at block 1401 originated from syndicated promotional materials. The promotion management system may make this determination, and further determine the identity of the distributor who distributed the syndicated promotional materials, based on the URL query parameters and/or other information as described above. If the click did originate from a distributor, then the promotion management system may allocate revenue between the purchaser and the distributor based on the revenue sharing scheme for syndication of the rebate promotion.

In an embodiment, regardless of whether or not the click is discarded or credited to the purchaser's account, the promotion management system redirects the promotion viewer who initially clicked on the promotional material to a linked page. The linked page may be defined as part of the promotion data and may direct the promotion viewer to the retailer or to another appropriate location. The redirect may be performed using an HTTP redirect message such as a 30× HTTP response. In an alternate embodiment, rather than redirecting the promotion viewer to a linked page, the promotion management system may respond to the promotion viewer by directly sending content associated with the rebate promotion.

At block 1408, the promotion management system optionally monitors activity on the linked page or other content to which the promotion viewer was directed at block 1407. In an embodiment, the activity monitoring is performed using client side and/or server side code included on the retailer's site or other site appropriate for the linked page. Such activity monitoring may provide statistics and/or other information indicative of the effectiveness of the rebate promotion and/or advertising campaigns which may be collected by the promotion management system to be provided to the retailer and/or other appropriate entity immediately and/or at a later time.

Figure 15:
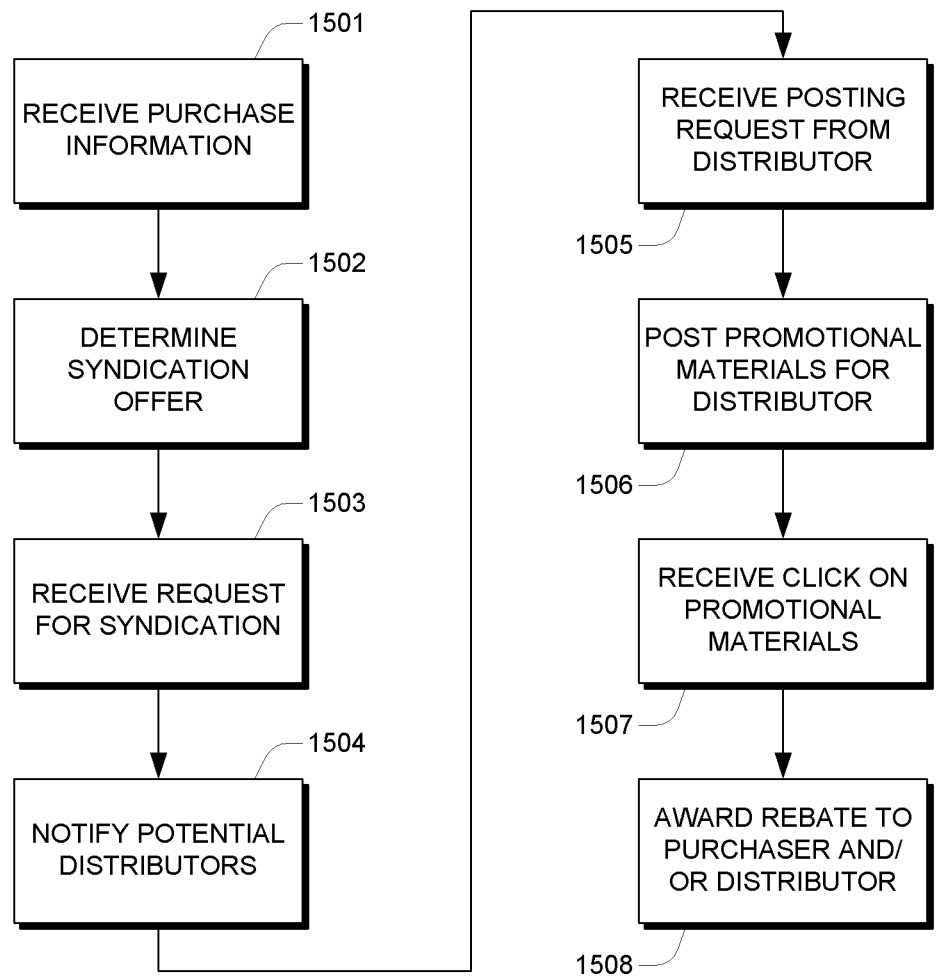
FIG. 15 is a flowchart of a process of syndicating a rebate promotion, as used in an embodiment.

FIG. 15 is a flowchart of a process of syndicating a rebate promotion, as used in an embodiment. The process may be performed, for example, by rebate promotion system 101 of FIG. 1. The process may be performed as part or all of the processes described with respect to FIGS. 3-4. In various embodiments, additional blocks may be included, some blocks may be removed, and/or blocks may be connected or arranged differently from what is shown.

At block 1501, the system receives purchase information relating to a purchase from a retailer eligible for a rebate promotion. This process may be that previously described with respect to block 402 of FIG. 4, for example. The associated rebate promotion may permit for syndication of the rebate promotion, so that parties other than the purchaser, such as distributors 107 of FIG. 1, may post promotional materials and receive portions of the associated rebate.

At block 1502, the system determines a syndication offer, which may be included as part of the rebate promotion offer. The syndication offer may include a percentage of the rebate that will be given to distributors who successfully distribute the promotional materials and receive clicks on those promotional materials. The syndication offer may be a fixed percentage set by the system, such as 25%, and/or a percentage chosen by the retailer offering the rebate promotion. As described previously, the rebate sharing scheme may involve calculations other than a fixed percentage allocation. The purchaser may then be informed as to the syndication offer, through a user interface, email, and/or other communication.

The purchaser may then accept the syndication offer or otherwise request syndication at block 1503. The request for syndication may be recorded in the purchaser's account, which may be a temporary account as described above. At block 1504, potential distributors may be notified of the syndication of the rebate promotion by the purchaser, so that those potential distributors may post the appropriate promotional materials.

The potential distributors at block 1504 may be limited in various ways. In an embodiment, a distributor of a particular syndicated rebate promotion must have previously purchased the same product as the purchaser. Alternately, distributors may be limited to those who previously purchased similar products, who purchased products from the same retailer, who purchased products within the same rebate promotion, and/or the like. Such limitations may ensure that the distributors of syndicated promotional materials have appropriate connections to the rebate promotion, providing the credibility enhancements described previously. The system may also limit distributors based on selections by the purchaser, reputations of the distributors (as calculated, for example, by past promotional material posting history), demographic and/or personal factors (for example, distributors similar to the purchaser), and so on.

Potential distributors may be notified at block 1504 by various mechanisms. In one embodiment, the system may provide a distributor with a user interface such as a web page or mobile device content, identifying syndicated rebate promotions available to the distributor. The potential distributors may additionally or alternatively be notified by push notifications, emails, text messages, mobile application notifications, and the like. The system may selectively notify distributors of, and/or display to distributors, available syndicated rebate promotions based on the distributor limitations described previously, so that only those distributors eligible to participate in the syndicated rebate promotion are made aware of the promotion.

At block 1505, the system receives a request from a distributor to post syndicated promotional materials. The request may be, for example, a request to post the promotional materials on a social networking site or other site, a request to email or message others with the promotional materials, and/or other type of request. The requests may be analogous to those made by purchasers who wish to post promotional materials directly, and they may be made on a user interface similar to that shown at interface elements 1002 in FIG. 10.

In response, the system may then post the syndicated promotional materials for the distributor, at block 1506. The posting process may be similar to that described with respect to interface elements 1002. As described previously, the posted materials may include an identifier, such as a URL query parameter, to associate the posted materials with the purchaser and/or the rebate promotion. In the case that the promotional materials are syndicated and posted by a distributor rather than by the purchaser, the identifier may further be associated with the distributor, so that the distributor may be appropriately identified and credited when viewers interact with the promotional materials. The system may additionally or alternatively make promotional materials directly available to distributors and/or other entities, so that those entities may post the promotional materials directly rather than requesting the system to do so at block 1505.

At block 1507, the system detects a click or other appropriate interaction with the promotional materials posted at block 1506. In response, the system may identify the purchaser, rebate promotion, and/or distributor associated with the promotional materials, and the purchaser and/or distributor may be credited with a partial or full rebate at block 1508. The process of detecting the interaction and crediting accounts may be similar to that described previously with respect to FIG. 14.

Figure 16:
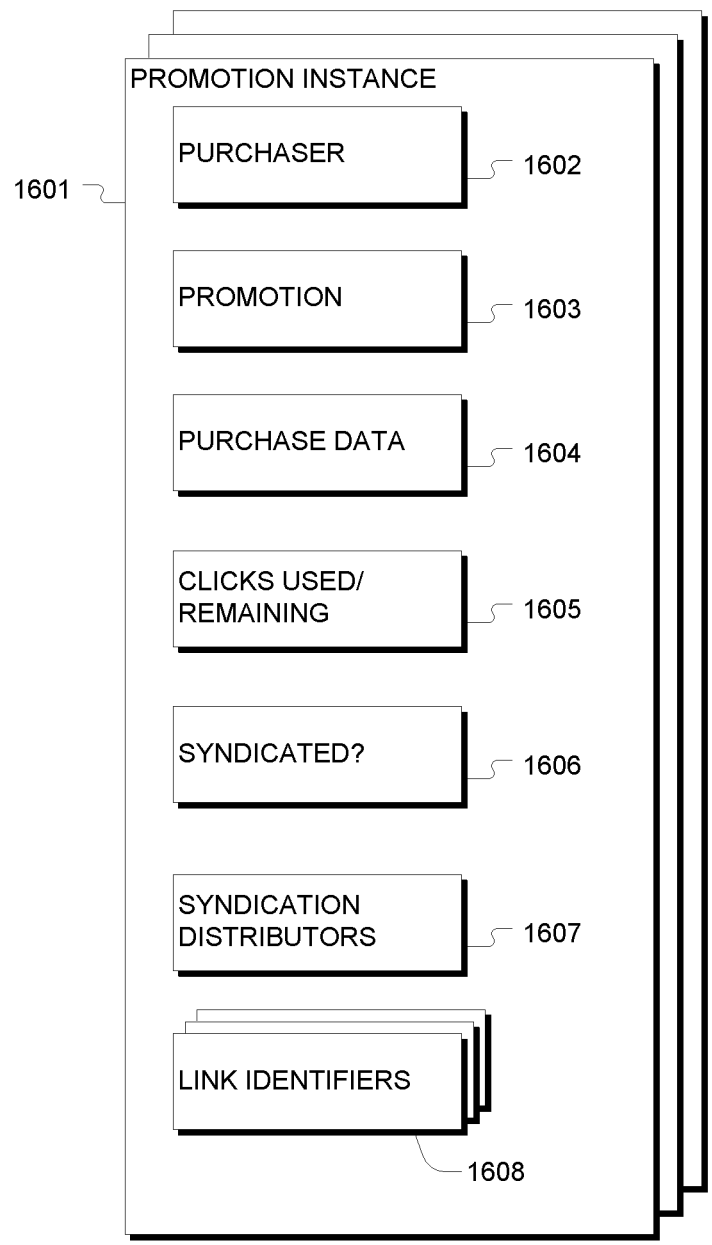
FIG. 16 is a block diagram of a data structure of a promotion instance, as used in an embodiment.

FIG. 16 is a block diagram of a data structure of a promotion instance, as used in an embodiment. A "promotion instance" may be a representation of a particular instance of a rebate promotion in which a purchaser is engaged. The promotion instance data may be created and/or stored, for example, at the time that a purchaser agrees to participate in a rebate promotion, and the data may maintain the status of that purchaser's participation in the promotion. The data structure may be stored on computer-readable media such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown.

Promotion instance 1601 may include references to a purchaser account 1602 and a rebate promotion 1603, the latter of which may reference a data structure such as that shown in FIG. 6. The reference to the purchaser account 1602 may be a reference to a temporary or permanent account, as described above. The promotion instance 1601 may further include purchase data 1604, which may include the items purchased, the purchase amount, the rebate-eligible purchase amount, the maximum rebate amount, and the like. The reference to the rebate promotion 1603 and/or the purchase data 1604 may be used to calculate the awarded rebate amounts.

In an embodiment, rebate promotion data 1603 may be copied into promotion instance data 1601 rather than being linked or referenced, so that changes to the overall rebate promotion parameters do not affect promotion instances that are ongoing. For example, a purchaser may be offered a 10% rebate, and subsequently the retailer may change the rebate promotion to only offer a 5% rebate, so the original 10% rebate value may be copied into the purchaser's promotion instance data so that the purchaser continues to receive the original 10% rebate. In alternate embodiments, the rebate offered to the purchaser may be changed after the fact, or rebate promotions may be made unalterable (so that the retailer would have to discontinue the 10% promotion and create a new 5% promotion in order to achieve the above change).

Promotion instance data 1601 may also include records 1605 of clicks or other interactions with promotional data. These records may be used to determine the partial rebate to be awarded the purchaser. The records may include a count of clicks or other interactions, and/or they may include specific information about each click or interaction. The latter form of records may enable determinations of legitimacy of clicks, for example.

As described previously, the purchaser may, in an embodiment, be given the option to syndicate a particular rebate promotion. If the purchaser chooses to syndicate, this choice may be stored in the purchaser's promotion instance data 1601, for example in flag 1606. Thus, in an embodiment, some purchasers may choose to syndicate, while other purchasers may choose not to syndicate, perhaps because those purchasers are more confident in their abilities to generate clicks or other transactions.

The promotion instance data 1601 may optionally include indications or references to syndication distributors 1607. This may be used to identify rules for selection of permitted distributors and/or indications of specific permitted (or not permitted) distributors of syndicated promotional materials, as identified by the system and/or selected by the purchaser. Alternately, the system may determine permitted distributors automatically, so that the list of permitted distributors need not be stored in promotion instance data 1601. The promotion instance data may further identify those distributors who have generated successful clicks or interactions by posting syndicated promotional materials, so that those distributors may be credited appropriately.

Promotion instance data 1601 may further include link identifiers 1608 and/or other identifiers. These identifiers may be correlated or otherwise associated with identifiers in promotional materials, such as URL query parameters and/or short URL links, so that clicks or interactions with those posted promotional materials can be traced back to the promotion instance and then to the purchaser and rebate promotion. In the case that a purchaser chooses to syndicate a rebate promotion, multiple identifiers 1608 may be included, so that the distributors posting syndicated promotional materials may be differentiated when those syndicated promotional materials are clicked or otherwise interacted with.

Figure 17:
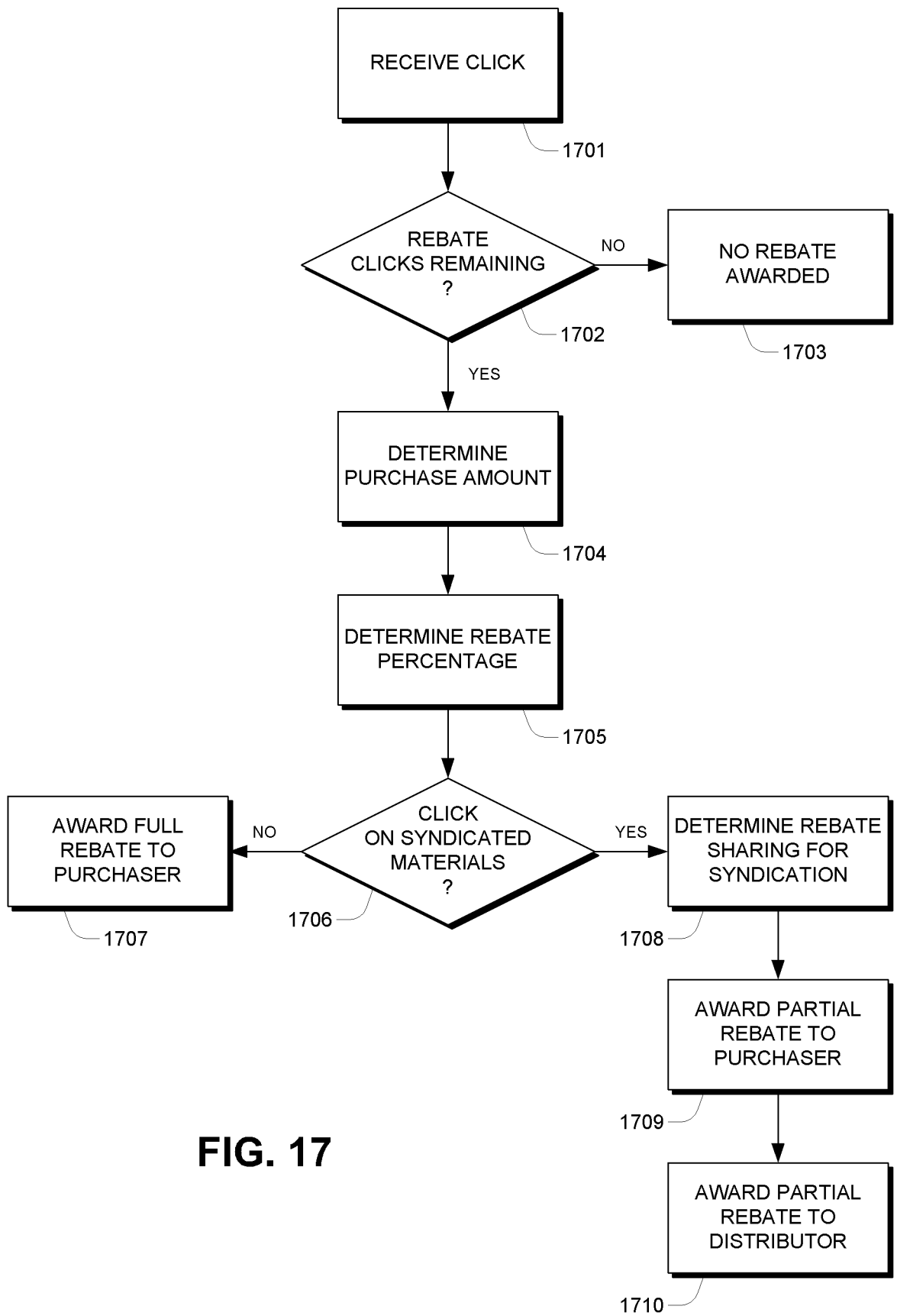
FIG. 17 is a flowchart of a process of allocating rebates, as used in an embodiment.

FIG. 17 is a flowchart of a process of allocating rebates, as used in an embodiment. The process may be used, for example, within the process described with respect to FIG. 14. The process may be performed, for example, by promotion management system 101 of FIG. 1. In various embodiments, additional blocks may be included, some blocks may be removed, and/or blocks may be connected or arranged differently from what is shown.

At block 1701, the system detects a click or other interaction with promotional materials. The system may then determine whether there are remaining rebate-eligible clicks for the promotion instance associated with the clicked promotional materials. The determination may be based on, for example, data element 1605 of FIG. 16. The determination may be similar to (and part or all of) the process described with respect to block 1403 of FIG. 14. If no eligible clicks remain, then at block 1703 no rebate is awarded.

At block 1074 and 1705, the system determines the purchase amount and rebate percentage, as well as other parameters as needed to calculate the rebate to be awarded for the detected click or interaction. The calculation may be similar to that described with respect to block 1406 of FIG. 14.

At block 1706, the system then may determine whether the click or interaction detected at block 1701 was associated with promotional materials that were syndicated and posted by a third-party distributor rather than the purchaser. If the promotional materials were posted by the purchaser, then at block 1707 the purchaser is awarded the full rebate due for the detected click or interaction.

If, on the other hand, the system determines that the click or interaction was on promotional material posted by a third-party distributor, then at block 1708 the system may assess a rebate due to both the original purchaser and the third-party distributor. In an embodiment, at block 1708, the system determines the overall rebate to be awarded for the click or interaction (for example, based on the purchase price, number of clicks, maximum rebate percentage, and so on) as described previously, and then the system allocates the calculated rebate amount between the distributor and the purchaser based on a rebate sharing percentage or formula, as described previously with respect to syndication parameters 609 of FIG. 6. The calculated rebates may then be awarded to the purchaser and distributor at blocks 1709 and 1710.

Additional Embodiments

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and tasks described herein may be performed and fully automated by a computer system. The computer system may, in some cases, include multiple distinct computers or computing devices (for example, physical servers, workstations, storage arrays, and so forth) that electronically communicate and interoperate over a network to perform the described functions. Each such computing device typically includes a processor (or multiple processors) that executes program instructions or modules stored in a memory or other computer-readable storage medium. Where the system includes multiple computing devices, these devices may, but need not, be co-located. The results of the disclosed methods and tasks may be persistently stored by transforming physical storage devices, such as solid state memory chips and/or magnetic disks, into a different state.

All of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware. The results of the disclosed methods be stored in any type of computer data repository, such as relational databases and flat file systems that use magnetic disk storage and/or solid state RAM.

Many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method, performed by a promotion management computing system having one or more hardware computer processors configured to communicate with a purchaser computing system and a promotion database via one or more digital communication networks, and one or more non-transitory computer readable storage device storing software instructions executable by the promotion management computing system to perform the computerized method comprising:
   generating, by the one or more hardware computer processors of the promotion management computing system, plugin code configured to execute on a purchaser computing system operated by a user;
   transmitting, to the purchaser computing system, the plugin code configured to execute on the purchaser computing system, wherein the plugin code is configured to interface with a browser executing on the purchaser computing system to:
      monitor user activity within the browser on the purchaser computing system;
      automatically identify user activity within the browser indicative of product purchases made by the user;
      display an indication of interactions with social media content posted by the user regarding a product purchased by the user that qualifies for payment of at least a portion of a maximum rebate amount to the user;
      receive, from the user via a web form rendered by the browser executing on the purchaser computing system, a financial account identifier of the user; and
      transmit, to the promotion management computing system, purchase information associated with each identified purchase;
   receiving, at the promotion management computing system having one or more computer processors, via the plugin code executing on the purchaser computing system, purchase information associated with one or more purchases made by the user that are automatically identified by the plugin code, wherein the purchase information indicates, for each of the one or more purchases:
      an API key configured to enable communication between the purchaser computing system and the promotion management computing system,
      a product identifier of an already purchased product,
      a price paid for the product, and
      an online retailer from which the product was purchased;
   for each purchase information received from the purchaser computing system,
      accessing a promotion database to identify rebate criteria provided by the online retailer indicated in the purchase information, wherein the rebate criteria includes one or more criteria usable to identify products qualifying for rebate and a percentage rebate for purchased products that qualify for rebate;
      automatically determining, based on the rebate criteria, whether the purchase information associated with the already purchased product matches the rebate criteria and, therefore, qualifies for rebate; and
      in response to determining that the purchase qualifies for rebate, automatically calculating, by the one or more computer processors, a maximum rebate amount based at least on:
         the price paid for the product, as indicated in the purchase information received from the purchaser computing system; and
         the identified percentage rebate in the promotion database that is associated with the online retailer indicated in the purchase information received from the purchaser computing system;
   receiving, at the promotion management computing system, via the plugin code executing on the purchaser computing system, the financial account identifier provided by the user; and
   in response to receiving, at the promotion management computing system, an indication of detection of an interaction with social media content posted by the user regarding the purchased product, transmitting at least a portion of the maximum rebate amount to the financial account identifier provided by the user.

2. The computerized method of claim 1, wherein the promotion management computing system is further configured to:
   create a temporary account for the user,
   store the purchase information in the temporary account;
   request confirmation of the financial account identifier from the user, and
   in response to receiving account confirmation from the user, initiate transmission of the at least a portion of the maximum rebate amount to the financial account identifier.

3. The computerized method of claim 1, further comprising sending, to the browser executing on the purchaser computing system, an HTTP redirection message directing the browser to a promotional website location, the promotional website location being determined based at least in part upon input from the online retailer.

4. A promotion management computing system comprising:
   a hardware computer processor;
   a communication interface configured to enable communications, via one or more digital communication networks, with a purchaser computing system and a promotion database;
   a non-transitory computer readable medium having software instructions stored thereon, the software instructions executable by the hardware computer processor to cause the computing system to perform operations comprising:
      generating, by the one or more hardware computer processors of the promotion management computing system, plugin code configured to execute on a purchaser computing system operated by a user;
      transmitting, to the purchaser computing system, the plugin code configured to execute on the purchaser computing system, wherein the plugin code is configured to interface with a browser executing on the purchaser computing system to:
         monitor user activity within the browser on the purchaser computing system;
         automatically identify user activity within the browser indicative of product purchases made by the user;
         display an indication of interactions with social media content posted by the user regarding a product purchased by the user that qualifies for payment of at least a portion of a maximum rebate amount to the user;

receive, from the user via a web form rendered by the browser executing on the purchaser computing system, a financial account identifier of the user; and transmit, to the promotion management computing system, purchase information associated with each identified purchase;

receiving, at the promotion management computing system having one or more computer processors, via the plugin code executing on the purchaser computing system, purchase information associated with one or more purchases made by the user that are automatically identified by the plugin code, wherein the purchase information indicates, for each of the one or more purchases:

an API key configured to enable communication between the purchaser computing system and the promotion management computing system, a product identifier of an already purchased product, a price paid for the product, and an online retailer from which the product was purchased;

for each purchase information received from the purchaser computing system, accessing a promotion database to identify rebate criteria provided by the online retailer indicated in the purchase information, wherein the rebate criteria includes one or more criteria usable to identify products qualifying for rebate and a percentage rebate for purchased products that qualify for rebate;

automatically determining, based on the rebate criteria, whether the purchase information associated with the already purchased product matches the rebate criteria and, therefore, qualifies for rebate; and in response to determining that the purchase qualifies for rebate, automatically calculating, by the one or more computer processors, a maximum rebate amount based at least on:

the price paid for the product, as indicated in the purchase information received from the purchaser computing system; and the identified percentage rebate in the promotion database that is associated with the online retailer indicated in the purchase information received from the purchaser computing system;

receiving, at the promotion management computing system, via the plugin code executing on the purchaser computing system, the financial account identifier provided by the user; and in response to receiving, at the promotion management computing system, an indication of detection of an interaction with social media content posted by the user regarding the purchased product, transmitting at least a portion of the maximum rebate amount to the financial account identifier provided by the user.

5. The promotion management computing system of claim 4, wherein operations further comprise:

creating a temporary account for the user, storing the purchase information in the temporary account;

requesting confirmation of the financial account identifier from the user, and in response to receiving account confirmation from the user, initiating transmission of the at least a portion of the maximum rebate amount to the financial account identifier.

6. The promotion management computing system of claim 5, wherein the operations further comprise:

sending, to the browser executing on the purchaser computing system, an HTTP redirection message directing the browser to a promotional website location, the promotional website location being determined based at least in part upon input from the online retailer.

* * * * *